United States Patent
Chinn et al.

(10) Patent No.: US 7,174,099 B1
(45) Date of Patent: Feb. 6, 2007

(54) SYSTEM FOR REGULATING OPTICAL OUTPUT POWER

(75) Inventors: Stephen R. Chinn, Alexandria, VA (US); Philip A. Lee, New Braintree, MA (US); James K. Roberge, Lincoln, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 594 days.

(21) Appl. No.: 10/337,617

(22) Filed: Jan. 7, 2003

Related U.S. Application Data

(60) Provisional application No. 60/351,065, filed on Jan. 23, 2002.

(51) Int. Cl.
  H04B 10/00 (2006.01)
  H04B 10/08 (2006.01)
  H04B 10/04 (2006.01)
  H04B 10/06 (2006.01)
  H04B 10/12 (2006.01)

(52) U.S. Cl. .................. 398/38; 398/120; 398/123; 398/137; 398/162; 398/195; 398/206; 398/209; 398/213; 372/38.01; 372/29.02; 372/29.01; 372/29.011

(58) Field of Classification Search .......... 398/38, 398/93–84, 120, 123, 137, 162, 195, 206, 398/209, 213
See application file for complete search history.

(56) References Cited

U.S. PATENT DOCUMENTS 6,188,498 B1 * 2/2001 Link et al. .................. 398/195
6,219,165 B1 * 4/2001 Ota et al. .................... 398/197

2002/0027690 A1 * 3/2002 Bartur et al. ................ 359/152
2002/0093999 A1 * 7/2002 Tanaka ..................... 372/38.01
2002/0114365 A1 * 8/2002 Gilliland et al. ......... 372/38.02

OTHER PUBLICATIONS

Mechatronics, Electronic control system in mechanical and electrical engineering, 2nd edition, by W. Bolton, Prentice Hall, 1999, p. 291.*
Maxim High-Frequency/Fiber Communications Group, Modification of the MAX3867 for Burst-Mode Applications, Jun. 8, 2001, pp. 1-4.
Maxim Integrated Products, MAXIM +3.3V, 2.5Gbps SDH/SONET Laser Driver with Automatic Power Control, Sep. 1998, pp. 1-12.
Maxim High-Frequency/Fiber Communications Group, Modifications of the MAX3867 for Burst-Mode Applications, Aug. 2, 2001, pp. 1-5.
Maxim Integrated Products, MAXIM MAX3867 Evaluation Kit, Jun. 2000, pp. 1-12.

* cited by examiner

*Primary Examiner*—Jason Chan
*Assistant Examiner*—Danny Wai Lun Leung
(74) *Attorney, Agent, or Firm*—Blakely Sokoloff Taylor & Zafman LLP

(57) ABSTRACT

Systems and methods for regulating optical power are described. A system for regulating optical power includes a laser driver circuit that receives an enable/disable signal and a data modulator input. The enable/disable signal regulates asynchronous mode operation. The system also includes a laser module including a laser diode emitter and a photodiode detector. The laser module is coupled to the laser driver circuit and receives a laser bias current from the laser driver circuit. The system also includes a switch coupled to the photodiode to receive a signal from the photodiode detector. The system also includes an automatic power control (APC) feedback circuit that receives a signal from the switch and provides a laser bias current feedback signal to the laser driver circuit to compensate for power output changes in the laser diode emitter over time.

14 Claims, 21 Drawing Sheets

SYSTEM FOR REGULATING OPTICAL OUTPUT POWER

CROSS REFERENCE TO RELATED APPLICATIONS

This application claims the benefit of U.S. Provisional Patent Application No. 60/351,065, filed on Jan. 23, 2002, which is incorporated herein by reference.

STATEMENT REGARDING FEDERALLY SPONSORED RESEARCH

Not Applicable.

FIELD OF THE INVENTION

The present invention relates to optical communication and, more particularly, to optical output power control.

BACKGROUND OF THE INVENTION

Certain acronyms may be used herein and are defined below:

APC—Automatic Power Control

CMOS—Complementary metal-oxide-semiconductor cw—Continuous wave

DFB—Distributed Feedback

ECL—Emitter-coupled logic

FET—Field-effect transistor

Gb/s, Gbps—Gigabits per second (data rate)

Gigabit—$10^9$ bits

GHz—Giga Hertz, $10^9$ cycles per second (frequency)

LD—Laser diode

MQW—Multi-quantum well

MHz—Mega Hertz, $10^6$ cycles per second

NIC—Network interface card nm—Nanometer, $10^{-9}$ Meters

PCB—Printed circuit board

PRBS—Pseudo-random bit sequence s—Complex frequency, $j\omega+\alpha$

SPDT—Single-pole, double-throw

TEC—Thermo-electric cooler

TOPIX—Transparent Optical Protocol Independent Switching

TTL—Transistor-transistor logic

In some optical communication system architectures, several laser transmitters from different NICs on the same domain share a common optical fiber. Consequently, only one laser at a time is allowed to transmit, and the light from the others must be turned off. In principle, several means including external modulation and switching of the light can be used. However, cost and speed requirements call for direct control of the laser diode current. Thus, during the intervals when a given laser is turned off, no bias or modulation currents are allowed into the laser. The functional requirement of allowing only one laser to transmit by rapidly turning selected lasers on and off is also needed in other shared-media passive optical networks (PON) that are under development for local telecommunications networks.

On the other hand, a system requirement is that the (average) optical power from the laser be held constant while it is transmitting. Factors that tend to cause variation in this power are temperature variation (with characteristic times varying from seconds to days), and long-term aging (with characteristic times on the order of months to years). Lasers for long-distance telecommunications typically have internally stabilized temperature using thermoelectric coolers. However, in many applications the cost, package size, and power consumption required by temperature stabilization preclude its use.

Other systems compensate for laser power changes with temperature variation by controlling the laser bias current. Typically, both temperature and aging changes are compensated by simple closed-loop feedback, which monitors the laser average output power and regulates the bias current into the laser. The optical sensor that monitors the laser output power is an internal photo-diode that is incorporated in the laser package.

During burst-mode operation, when the laser may be deliberately turned off for long intervals, long-term average optical power monitoring may no longer be suitable for regulating the bias current. The system should monitor the fast time-average modulated power only during the ON burst, and use this signal to provide current feedback.

The laser diodes can be driven by current-source circuitry, which is usually provided by specialized laser driver chips that allow for separate fast data modulation outputs and slower offset bias currents. The driver bias current circuitry generally responds relatively slowly so the feedback voltage that controls the bias cannot be turned on and off to follow the burst pattern. For some known driver chips, the total output current can be enabled or disabled separately and quickly by an external gating signal.

Maxim Integrated Products has issued an Application Note (HFDN-14.0) that describes a modification to the Evaluation Board for their MAX3867 Laser Driver that purports to accomplish burst-mode APC. The feedback signal from the monitor photo-diode is input directly to the driver chip, and its internal circuitry and filtering are described in a high-level fashion. The photo-current signal appears to be amplified by a proportional trans-impedance feedback amplifier. With the burst-mode modification, the filter capacitor is switched either directly to the driver, or through a high-impedance buffer amplifier. This circuit does not function for data bursts less than 16 μs. However, certain applications require shorter data bursts, such as about 5 μs.

It would, therefore, be desirable to provide a system in which a slowly varying bias feedback signal can be applied to the driver, while it (and the laser) is rapidly gated on and off by a signal, such as an ENABLE/DISABLE signal, that regulates the burst mode operation.

SUMMARY OF THE INVENTION

The present invention provides a system that regulates the average optical output power during burst mode operation using a laser bias current feedback signal. A signal corresponding to the burst-mode data envelope provides an enable/disable signal. With this arrangement, the laser output signal can be used to provide feedback for regulating laser output power over time for relatively short data bursts. While the invention is primarily shown and described in conjunction with laser burst mode operation, it is understood that the invention is applicable to optical systems in general in which it is desirable to regulate the optical output power.

In one aspect of the invention, a system for regulating optical power includes a laser driver chip receiving an asynchronous enable/disable signal and a data modulator input. A laser module having a laser diode emitter and a photodiode detector is coupled to the laser driver chip. The laser module receives a laser bias current from the laser driver circuit. A switch, which receives the enable/disable signal and a signal from the photodiode detector, provides a signal to an automatic power control (APC) feedback circuit. The APC feedback signal provides a laser bias current feedback signal to the laser driver chip to compensate for laser power output changes over time.

BRIEF DESCRIPTION OF THE DRAWINGS

The invention will be more fully understood from the following detailed description taken in conjunction with the accompanying drawings, in which:

FIG. 5 is a screen display of burst-mode driver with APC switch OFF and ON;

DETAILED DESCRIPTION OF THE INVENTION

In general, the invention provides a circuit for regulating the average optical output power during a burst from a semiconductor laser, in which a data-modulated envelope is turned on and off in an asynchronous manner during burst-mode operation.

The inventive burst-mode APC system uses an externally available signal that follows the timing of the burst-mode data envelope as a gating signal. This gating signal quickly turns the laser driver chip completely ON or OFF, and maintains the previous feedback signal during OFF intervals when the optical monitor no longer provides an output.

Figure 1:
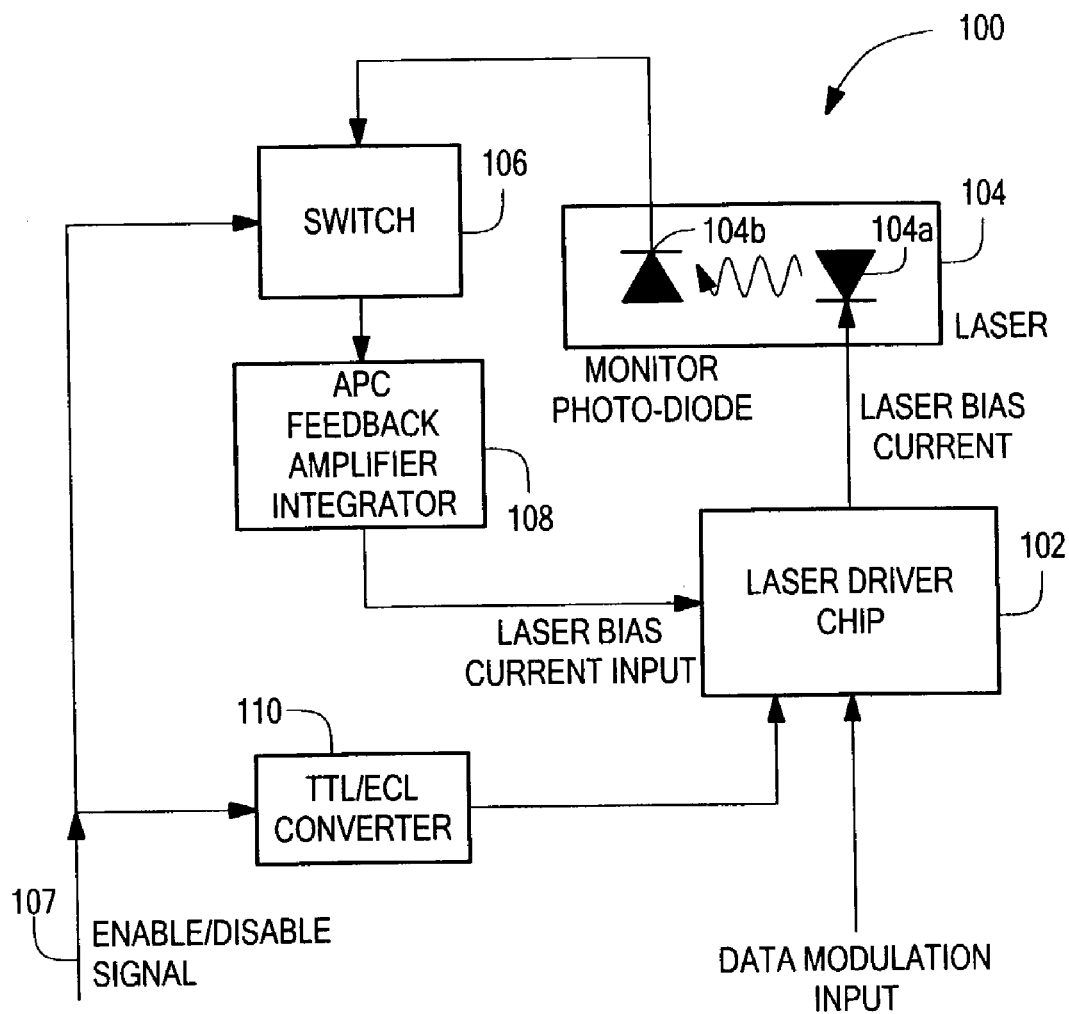
FIG. 1 is a block diagram of burst-mode APC functionality.

FIG. 1 shows a system 100 having burst-mode APC functionality in accordance with the present invention. A laser/driver chip 102 provides a laser bias current to a laser chip 104 having a laser diode 104a and a photodiode 104b for monitoring optical power. The photodiode 104b provides a signal to a switch 106 that receives an enable/disable signal and provides an output to an APC/feedback amplifier integrator circuit 108. The integrator circuit 108 provides a laser bias current input signal to the laser driver chip 102, which also receives the enable/disable signal and a data modulation input. A TTL/ECL converter chip 110 can convert the enable/disable signal if necessary.

Figure 2:
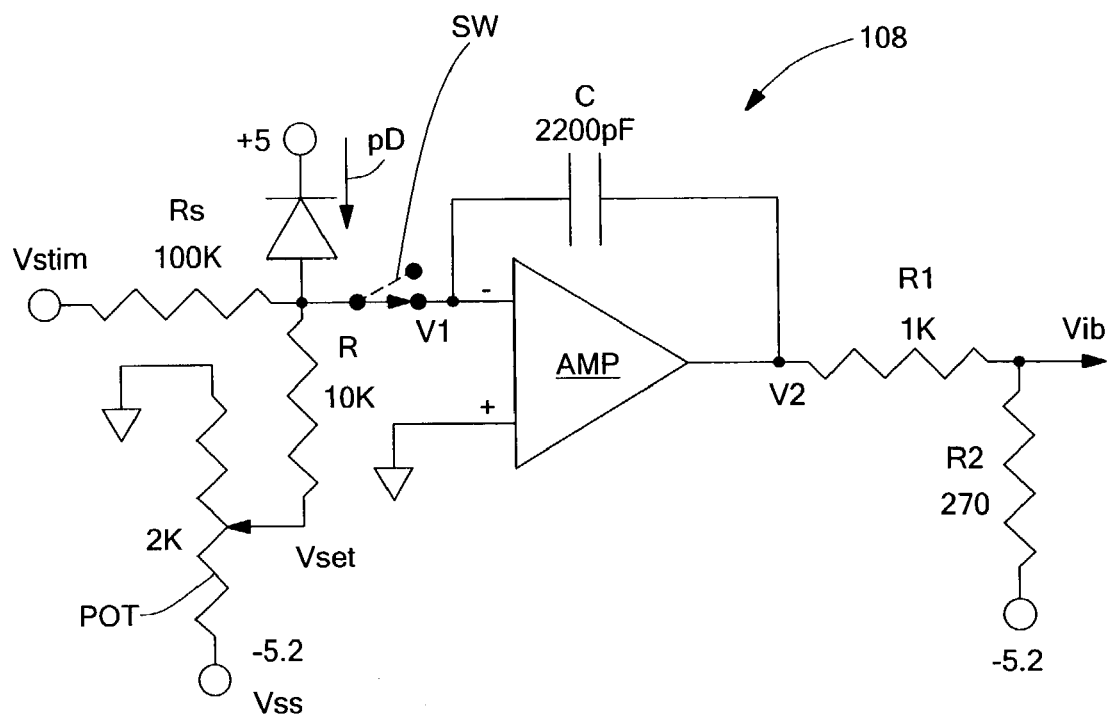
FIG. 2 is a high-level schematic of APC feedback circuitry.
Figure 2A:
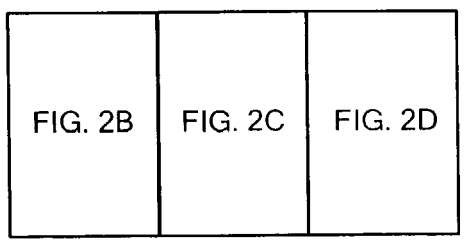
FIGS. 2A–2D, taken together, show a schematic diagram of an exemplary APC circuit.
Figure 2B:
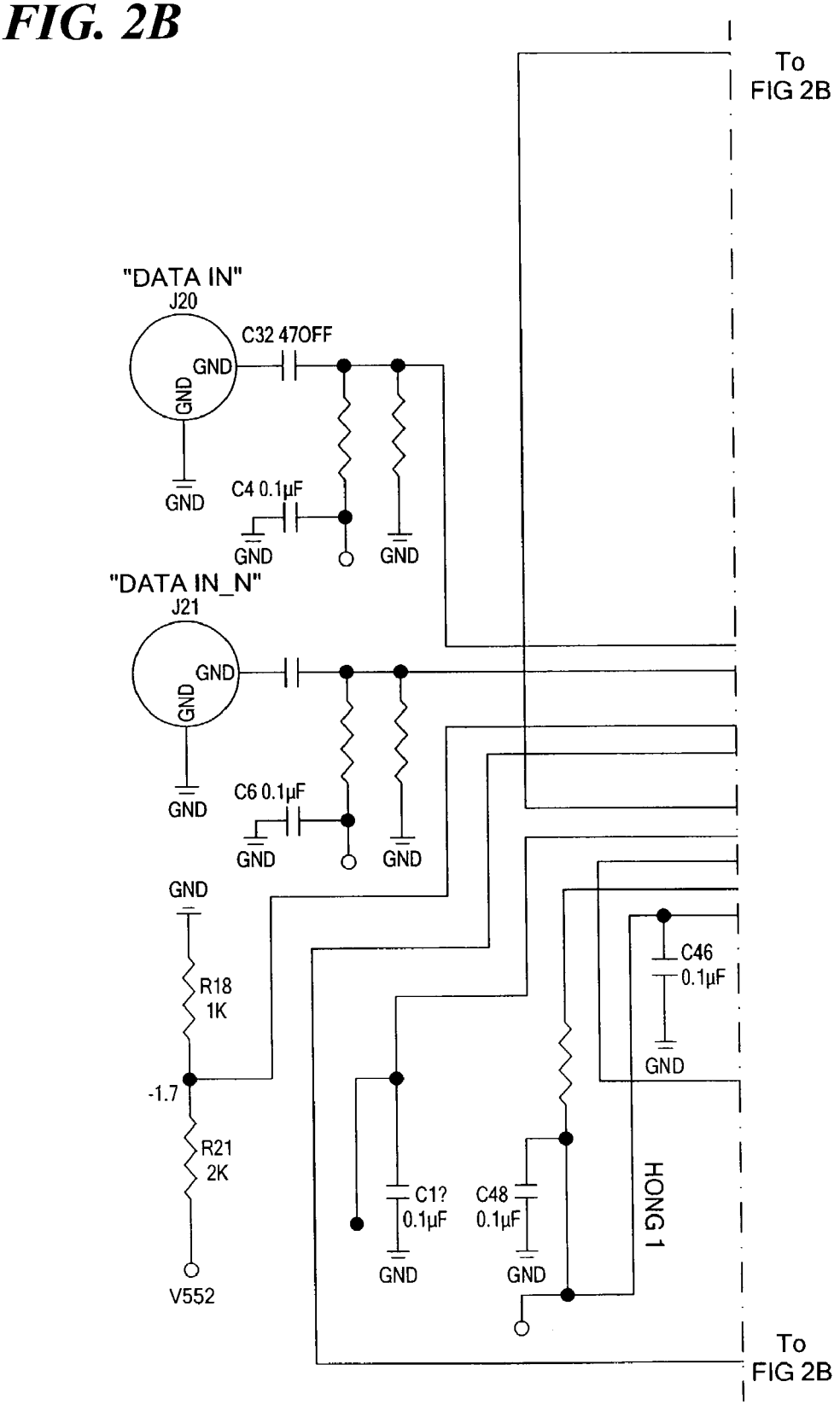
Figure 2C:
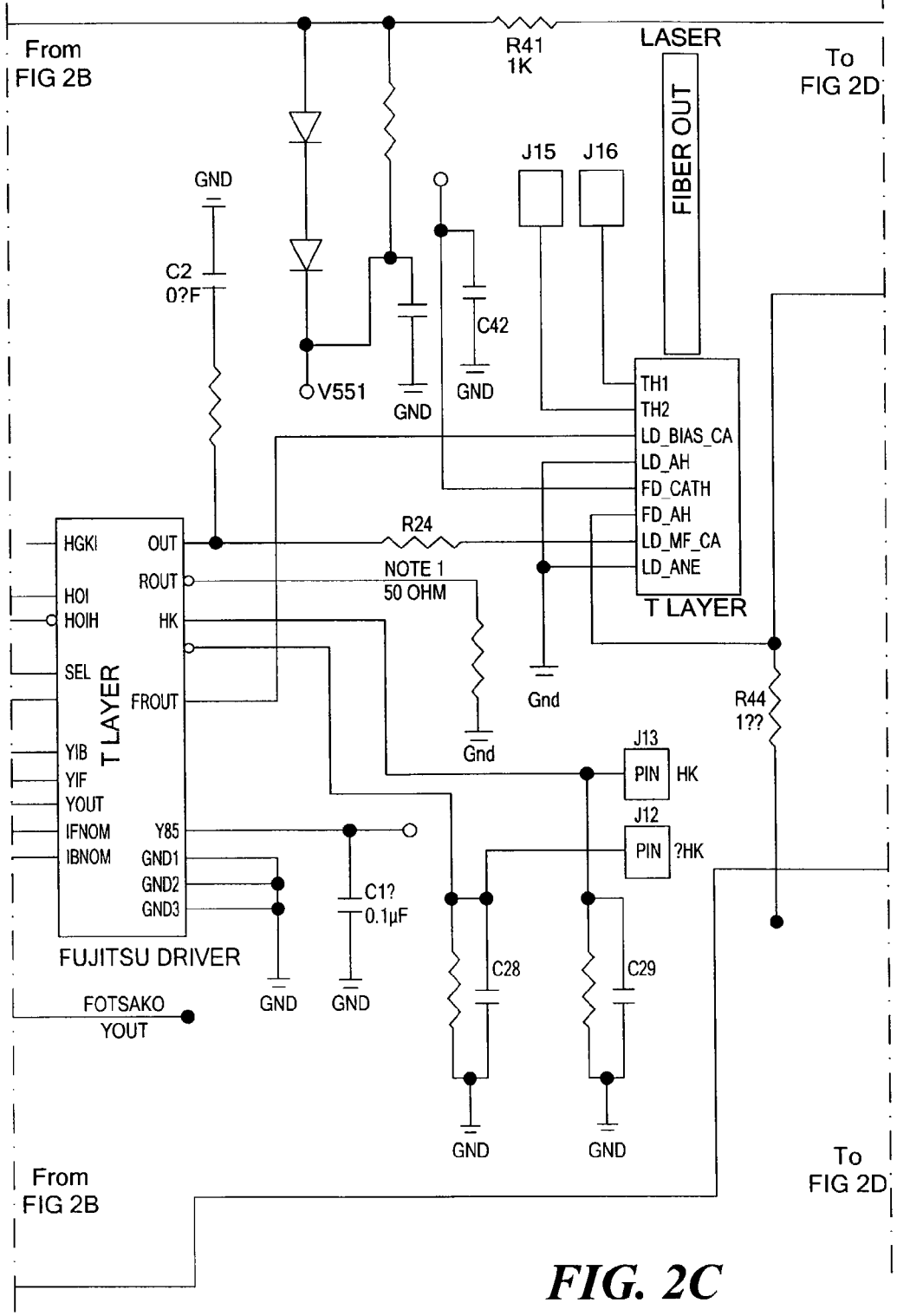
Figure 2D:
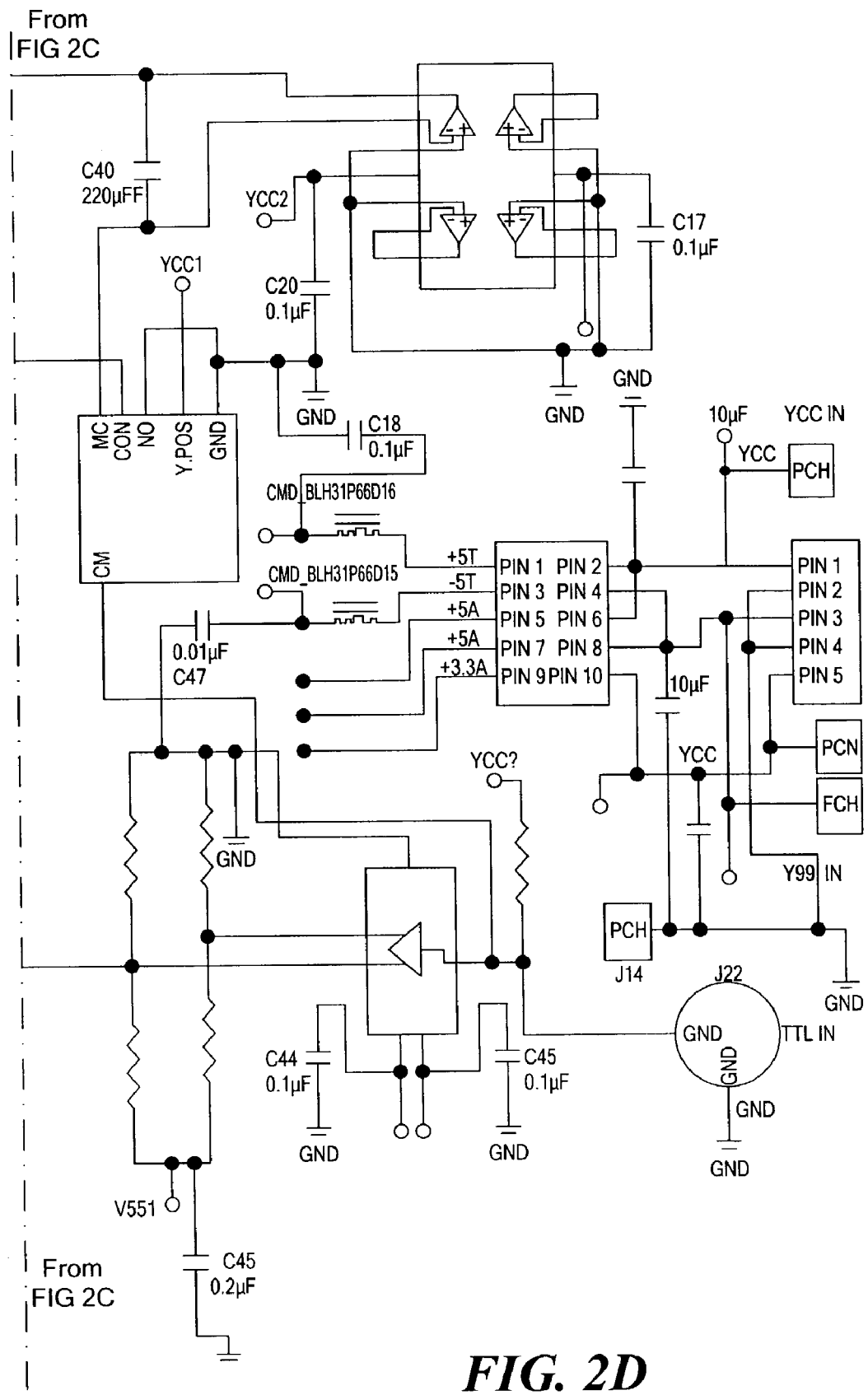

FIG. 2 shows a high-level schematic for the APC portion 108 of the circuitry of FIG. 1 to facilitate an understanding of its functionality. A more detailed exemplary circuit implementation is shown in FIGS. 2A–2D, taken together. A switch SW preceding the operational amplifier AMP is a fast electronic switch, driven by the gating voltage. When the switch SW is closed, the circuit operates in normal fashion and alters its output in response to changes in the photodiode current. When the switch SW is open during the DISABLE interval, the large input impedance of the operational amplifier AMP maintains the voltage across the capacitor C, which stabilizes the output voltage, even though the photodiode current is zero while the laser is off.

The circuit of FIG. 2 can be analyzed as follows. The burst-mode switch SW is assumed to be in the closed ON position, and the APC feedback is operating in its normal mode. The optical power from the laser induces a photocurrent $i_{PD}$ in the monitor photodiode 104b. The operational amplifier AMP has a large open-loop gain, G, and is assumed to have infinite input impedance. The analysis is set forth below in Equations 1–6:

$$C\frac{d}{dt}(V_1 - V_2) = i_{PD} + \frac{V_{SET} - V_1}{R}; V_2 = -GV_1; V_1 = -\frac{V_2}{G} \qquad \text{Eq. 1}$$

$$C\frac{d}{dt}\left(-V_2 - \frac{V_2}{G}\right) = i_{PD} + \frac{V_{SET} + \frac{V_2}{G}}{R}; -C\frac{d}{dt}V_2 \approx i_{PD} + \frac{V_{SET}}{R} \qquad \text{Eq. 2}$$

$$V_2 \approx -\frac{1}{C}\int\left(i_{PD} + \frac{V_{SET}}{R}\right)dt; -5.2 < V_{SET} < 0; i_{PD} > 0 \qquad \text{Eq. 3}$$

$$\frac{V_2 - V_{ib}}{R_1} \approx \frac{V_{ib} - V_{ss}}{R_2}; V_{ib}\left(\frac{1}{R_1} + \frac{1}{R_2}\right) = \frac{V_2}{R_1} + \frac{V_{ss}}{R_2} \qquad \text{Eq. 4}$$

$$V_{ib}\left(\frac{R_1 + R_2}{R_1 R_2}\right) = \frac{V_2}{R_1} + \frac{V_{ss}}{R_2}; V_{ib} = \frac{V_2 R_2 + V_{ss} R_1}{R_1 + R_2}$$

$$V_{ib} = V_2 \frac{R_2}{R_1 + R_2} + V_{ss} \frac{R_1}{R_1 + R_2}; \frac{R_2}{R_1 + R_2} \equiv \gamma; \frac{R_1}{R_1 + R_2} \equiv 1 - \gamma$$

$$V_{ib} = V_2 \gamma + V_{ss}(1 - \gamma) \qquad \text{Eq. 5}$$

$$V_{ib} \approx -\frac{\gamma}{C}\int\left(i_{PD} + \frac{V_{SET}}{R}\right)dt + V_{ss}(1-\gamma) \quad \text{Eq. 6}$$

where
C the feedback (integrating) capacitance around AMP,
$V_1$=the voltage at the inverting input of AMP,
$V_2$=the voltage at output of AMP.
$i_{PD}$=the photo-current through monitor photo-diode,
$V_{SET}$=the adjustable voltage to set optical power level,
R=the input resistance, converting $V_{SET}$ to input current,
G=the open-loop gain of operational amplifier AMP,
$V_{ib}$=the APC output voltage, input to laser driver,
$V_{ss}$=the negative DC bias supply voltage,
$V_{stim}$=External stimulus voltage for probing APC loop response,
$R_s$=the series resistance at AMP input to convert $V_{stim}$ to stimulus current,
$R_1$=the series resistance of AMP output,
$R_2$=the voltage-divider resistance of AMP output, and
γ=the voltage-divider ratio of AMP output.

Equation 6 shows that in the steady state, the integrand must be zero, so this defines the condition relating the photodiode current (and thereby the laser power) to the set point voltage Vset, determined by the potentiometer POT. The above equations assume that the load resistance of the laser driver chip is much larger than $R_2$.

Figure 3A:
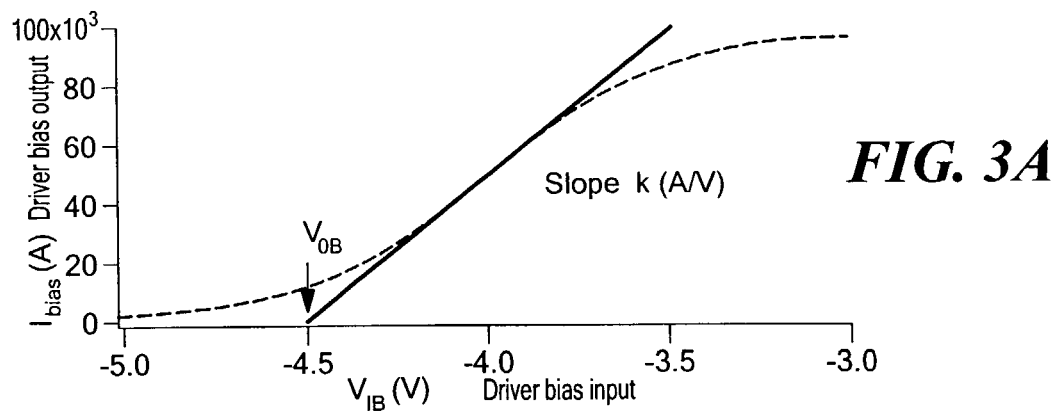
FIG. 3A is a graphical depiction of a driver APC loop transfer function.
Figure 3B:
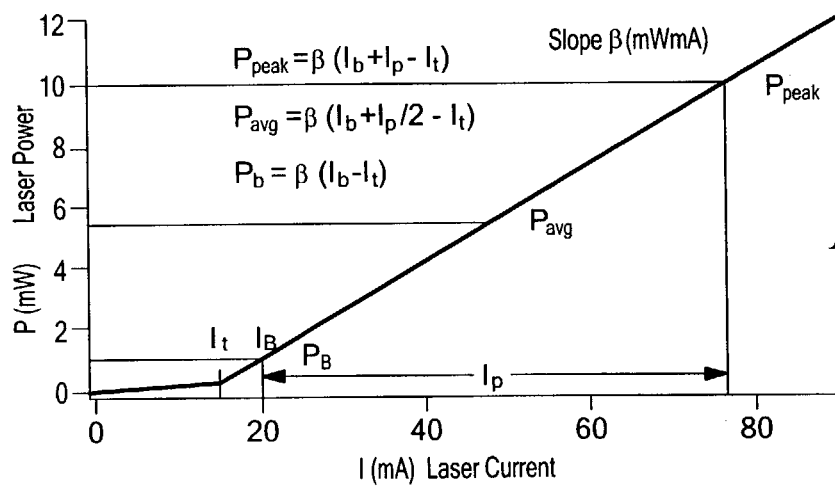
FIG. 3B is a graphical depiction of a laser APC loop transfer function.
Figure 3C:
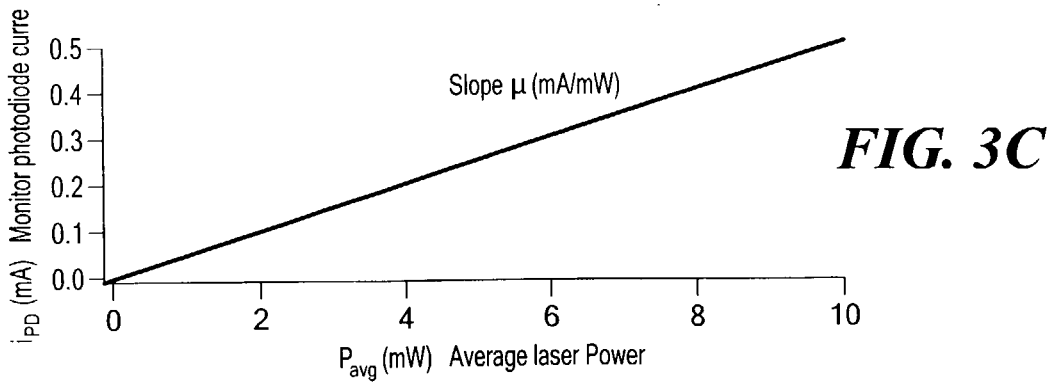
FIG. 3C is a graphical depiction of a monitor APC loop transfer function.

FIGS. 3A, 3B, and 3C shows exemplary APC loop transfer functions for the driver, laser, and monitor, respectively. To complete the closed-loop analysis of the circuit, the transfer functions of (1) driver bias current to input voltage, (2) laser power to bias current, and (3) photodiode current to laser power are used. Typical examples of these static transfer functions are shown in FIGS. 3A–3C, with typical scale parameters. The laser driver function of FIG. 3A shows a linearized characteristic, and a schematic illustration of a sigmoid shape, closer to the actual function. The closed-loop static operating point can be expressed in several ways, with Equation 7 below showing the relation of driver input voltage to the optical power and laser currents:

$$\kappa(V_{ib} - V_{0B}) + \frac{I_p}{2} - I_t = \frac{P_{avg}}{\beta} \quad \text{Eq. 7}$$

where
κ=Linearized ratio of driver output bias current to input voltage
$V_{0B}$=Voltage intercept of linearized driver transfer function
$I_p$=Peak-to-peak value of laser modulation current
$I_t$=Laser threshold current
β=Linear slope (ratio) of laser output power to input current
$I_b$=Laser bias current (at minimum modulation current)
$P_b$=Laser output power at $I_b$ input current
$P_{avg}$=Laser average output power at midpoint of modulation
$P_{peak}$=Laser average output power at peak of modulation
μ=Ratio of monitor photo-current to average laser power The circuit (FIG. 2) shows an additional voltage input, $V_{stim}$, in series with a large loading resistor $R_s$, which is introduced to allow measurement of the closed loop dynamics. The stimulus voltage acts as a small-signal current source adding to the photodiode current. By using either sinusoidal or step inputs, the small-signal AC or transient responses can be probed.

For generality, the possibility that the driver chip or its inter-board connection may contribute to the loop dynamics can be introduced by assigning it a complex impedance, $Z_L$. (This is discussed further below in conjunction with the measurement results.) For small-signal analysis in the Fourier (Laplace) transform domain, lower-case letters or tildes are used to denote small-signal, frequency-dependent variables. It is also assumed that both the laser and monitor photodiode responses are so fast compared to the integrating circuit that their static transfer functions can be used. From the previous equations, the relation set forth in Equation 8 below can be determined:

$$\frac{v_{ib}}{v_2} = \frac{R_2 \| Z_L}{R_1 + R_2 \| Z_L} = \frac{1}{1 + \frac{R_1}{R_2} + \frac{R_1}{Z_L}} \quad \text{Eq. 8}$$

where
$v_{ib}$=Small-signal APC output voltage
$v_2$=Small-signal AMP output voltage
$Z_L$=Complex load impedance in parallel with $R_2$
∥=Parallel resistance combination symbol After defining the Laplace variable s=jω+α, and the small-signal photocurrent $i_{\tilde{PD}}$, then $$-sC = i_{\tilde{PD}} + \frac{v_s}{R_s},$$

where $v_s$ is the small-signal stimulus voltage. Assume that $i_{\tilde{PD}}=\mu\beta\kappa v_{ib}$, and define $$\mu\beta\kappa \equiv \frac{1}{R_e},$$

where the coefficients μ, β, κ represent the linear slopes of the transfer functions of FIGS. 3A, 3B, and 3C, respectively, and $R_e$ is the equivalent loop resistance. Note that the product of the three variables has dimensions of inverse resistance. Then the response can be defined as set forth below in Equations 9–10

$$-sC\left(1 + \frac{R_1}{R_2} + \frac{R_1}{Z_L}\right)v_{ib} = \frac{v_{ib}}{R_e} + \frac{v_s}{R_s}$$

$$v_{ib}\left\{\frac{1}{R_e} + sC\left(1 + \frac{R_1}{R_2} + \frac{R_1}{Z_L}\right)\right\} = -\frac{v_s}{R_s} \quad \text{Eq. 9}$$

$$v_{ib}\left\{1 + sR_eC\left(1 + \frac{R_1}{R_2} + \frac{R_1}{Z_L}\right)\right\} = -v_s\frac{R_e}{R_s}$$

$$\frac{v_{ib}}{v_s} = -\frac{R_e}{R_s}\frac{1}{\left\{1 + sR_eC\left(1 + \frac{R_1}{R_2} + \frac{R_1}{Z_L}\right)\right\}} \quad \text{Eq. 10}$$

This response is that of a simple one-pole stable function, if the load impedance is fixed. However, as shown below, the data with the first composite circuit indicate a peaked response function in the frequency domain, and some overshoot in the time domain, indicative of a two-pole overall response. The simplest empirical form that can provide this is $$Y_L = \frac{1}{Z_L} = \frac{1}{R_L} + sC_L,$$

with an effective capacitance in the driver chip loading. In this case, the relationship of Equation 11 holds:

$$\frac{v_{ib}}{v_s} = -\frac{R_e}{R_s} \frac{1}{\left\{1 + s^2 R_e C R_1 C_L + s R_e C \left(1 + \frac{R_1}{R_2} + \frac{R_1}{R_L}\right)\right\}} \quad \text{Eq. 11}$$

Exemplary component values are:
$R_e \approx 1250\Omega$ (est.)
$R_1 = 1000\Omega$
$R_2 = 270\Omega$
$R_L = 10K\Omega$
$R_s = 100K\Omega$
$C = 2200$ pF $R_e$ is estimated from typical laser, monitor, and driver data sheet parameters, and $C_L$ has an unknown value, to be determined from measured data. The poles of this response function can be defined in Equation 12 below:

$$s_{1,2} = -\frac{\left(1 + \frac{R_1}{R_2} + \frac{R_1}{R_L}\right)}{2R_1 C_L} \pm \frac{j}{2} \sqrt{\frac{4}{\tau R_1 C_L} - \left[\frac{\left(1 + \frac{R_1}{R_2} + \frac{R_1}{R_L}\right)}{R_1 C_L}\right]^2} \equiv \quad \text{Eq. 12}$$

$$-\xi \pm j\eta, \tau \equiv R_e C$$

These poles have been written in the form appropriate to an under-damped response, as is the case for the chosen circuit parameters. Note that the optical loop coefficients play a role in determining the time constant τ. The time-domain impulse response can be found from contour integration and the residue theorem. The transient step response follows from time integration, and can be expressed in Equation 13 below:

$$h^{-1}(t) = \frac{1}{\eta} e^{-\xi t} (\xi \sin \eta t + \eta \cos \eta t) - 1 \quad \text{Eq. 13}$$

Experimental Results: Loop Response

A Maxim 4644 FET switch, driven by an external TTL signal, was used to open and close the feedback input to the LMC6484 operational amplifier. A MC100EL chip converted the TTL signal to ECL, used to ENABLE/DISABLE the Fujitsu laser driver chip.

Figure 4A:
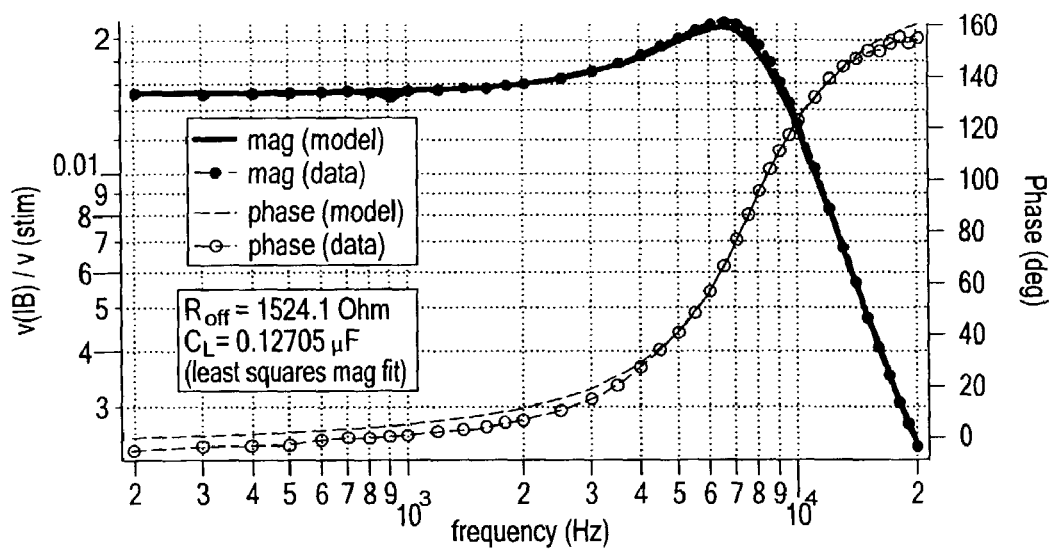
FIG. 4A is a graphical depiction of analytic results for APC loop dynamics.
Figure 4B:
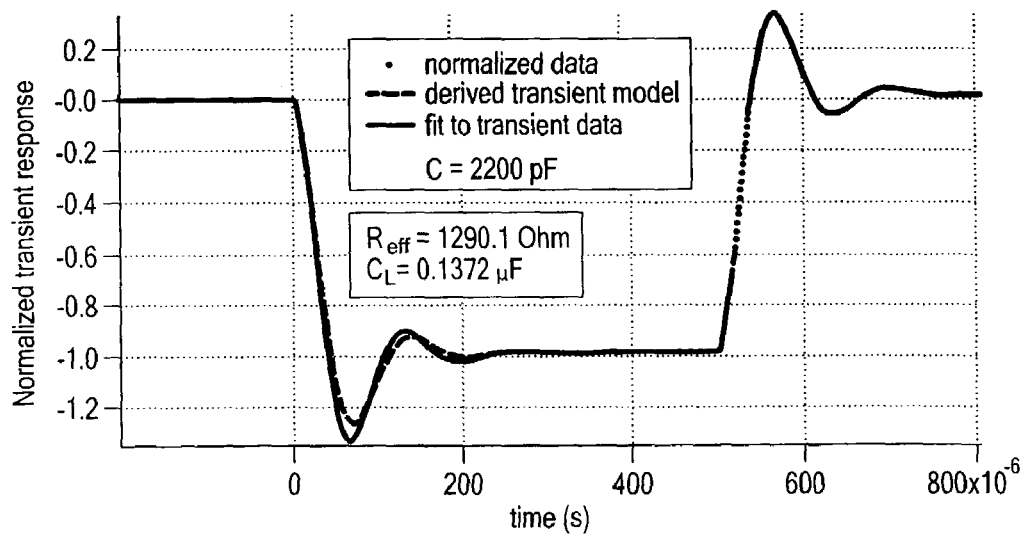
FIG. 4B is a graphical depiction of experimental results for APC loop dynamics.

To verify the closed-loop feedback design, the circuit was operated in a constant wave (cw) manner (FET switch closed) with external stimulus voltages applied to $R_s$. The results of these measurements are shown in FIGS. 4A and 4B. FIG. 4A shows the frequency domain response of the driver chip input bias voltage as a function of sinusoidal stimulus frequency. The magnitude and phase theoretical curves were fit by adjusting the unknown parameters $R_e$ and $C_L$, whose values, 1524Ω and 0.127 μF, are shown in the legend. A transient square-wave stimulus was then applied, with results indicated in the bottom portion of the figure. Fitting to the transient curve of FIG. 4B gave $R_e = 1290\Omega$ and $C_L = 0.137$ μF. The theoretical transient response using the frequency-derived parameters is also shown.

Thus, the choice of a parallel loading capacitance explains the behavior of the feedback circuit well. Alternatively, another explanation for the circuit behavior is that the driver has an internal limiting frequency response to bias current adjustment. The transfer function of the driver chip itself was also measured by treating the input bias voltage as an input variable (although it was still changing in response to the external stimulus), and the optical output from the laser as a direct measure of the bias current from the driver. This measurement showed that the $I_{out}/V_{in}$ function of the driver had a flat frequency response over the previous measurement range. One conclusion is that the connection to the driver chip has a frequency-dependent loading of the operational amplifier voltage divider output in the present circuit.

Experimental Results

Figure 5:
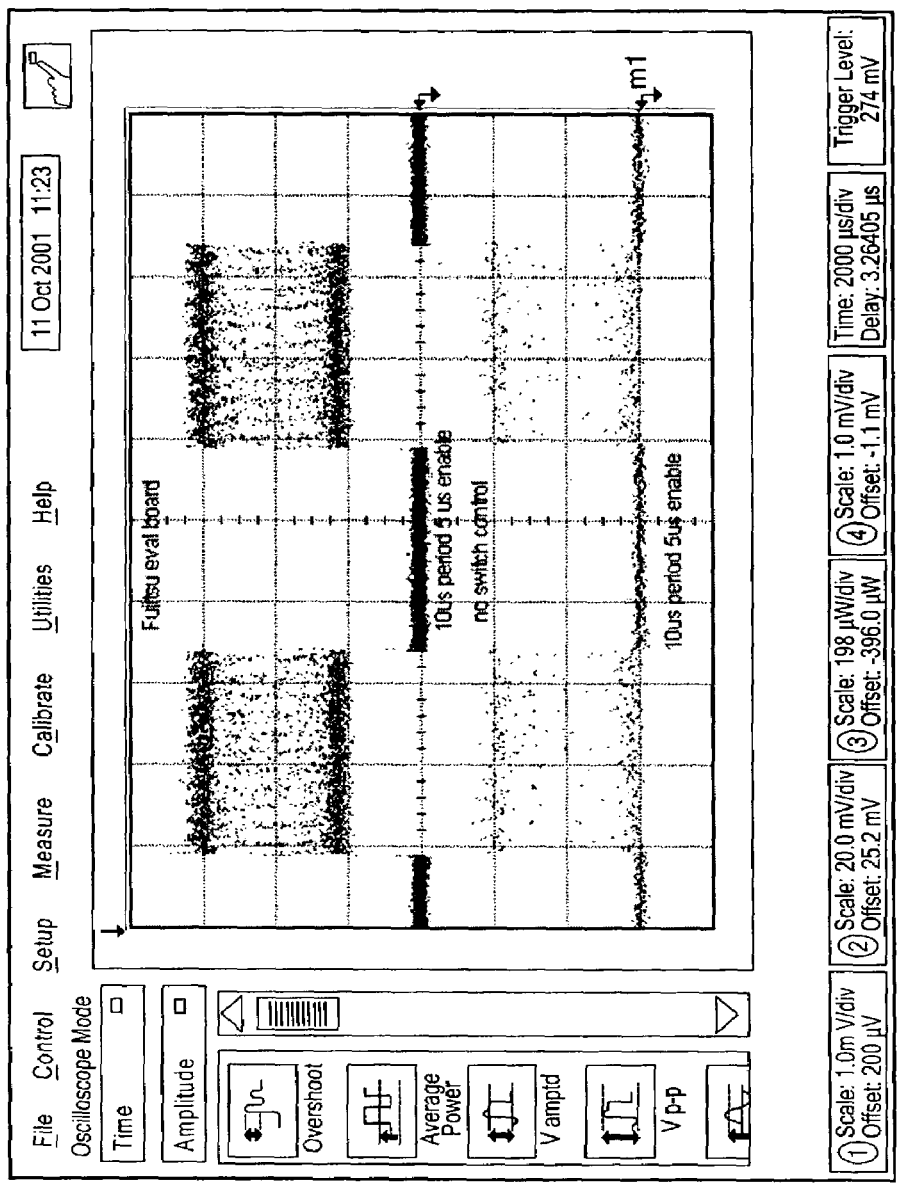

The screen shot of FIG. 5 shows operation of the circuit of FIG. 2 with the laser with the driver being ENABLED/DISABLED. In the top trace, the CMOS switch SW remains closed, and the bias current is maintained at a constant level by the APC circuit. Time-averaging over the OFF intervals causes the threshold level to be set at a higher than desired level. A tapped portion of the laser output is put in the 30 GHz optical detector head of an Infiniium sampling oscilloscope. The 2.5 Gbps data modulation cannot be resolved at these slow time scales, and appears as random modulation under the burst-mode envelope.

In the bottom trace, the ENABLE/DISABLE pulse now actuates the CMOS switch SW in burst-APC mode, so that power is averaged only over the ON interval. The bias threshold is now set to maintain the desired power in the ON interval, without excessive baseline level.

Figure 6:
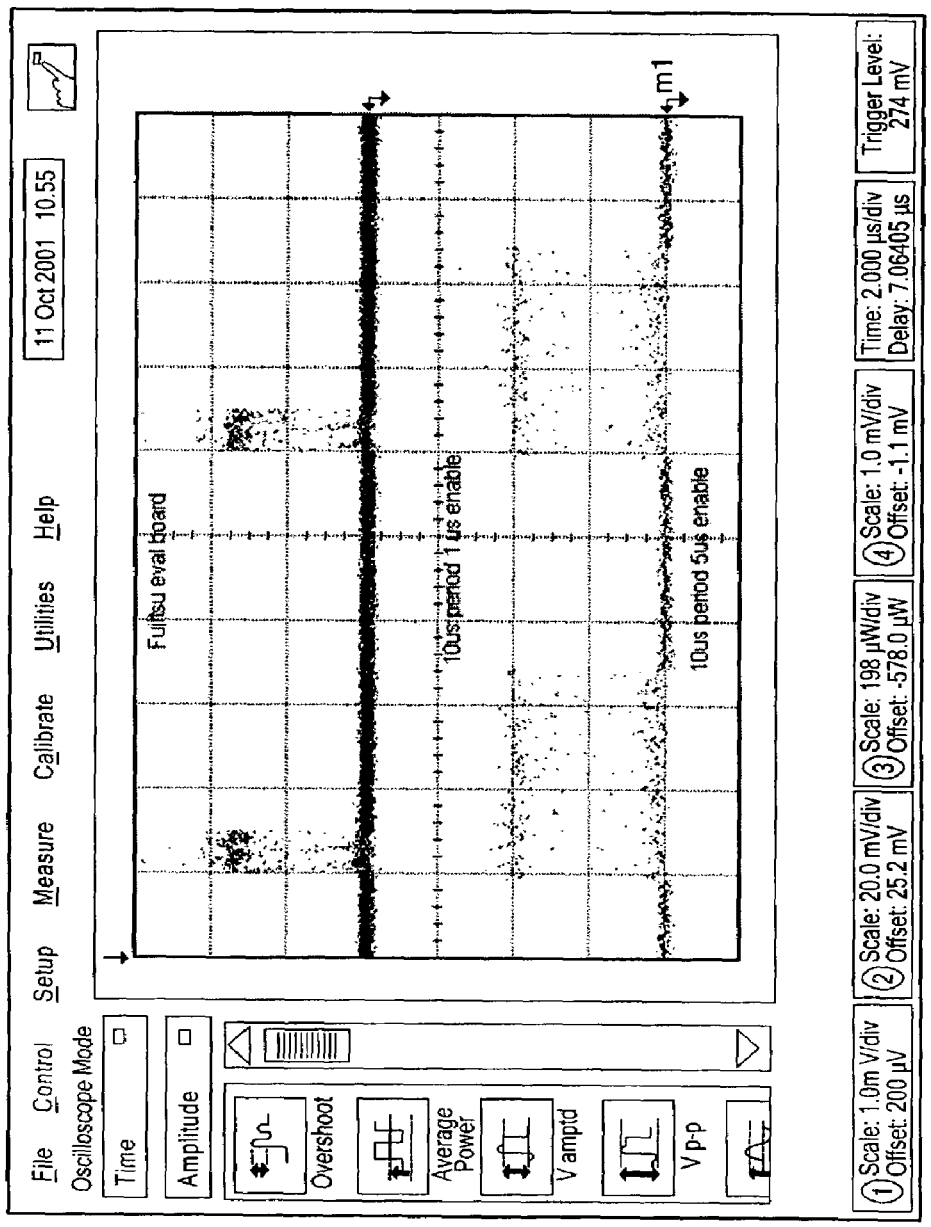
FIG. 6 is a screen display of burst-mode operation with varying duty cycle.

The screen shot of FIG. 6 shows the ability of the APC circuit to maintain constant power level as the duty cycle is varied from 10% to 50%. FIGS. 5 and 6 were obtained using a 1310-nm Fujitsu 14-pin butterfly-package laser.

Figure 7:
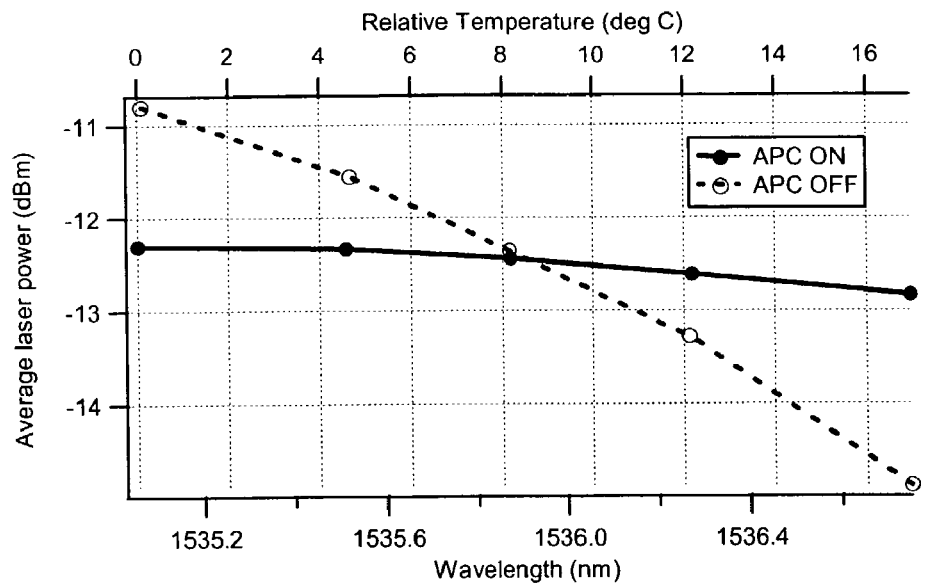
FIG. 7 is a graphical depiction of temperature compensation of an APC circuit.

FIG. 7 shows the ability of the APC circuit to compensate for temperature changes. These changes were induced by adjusting the set point of the internal thermo-electric cooler/heater inside the laser package. The laser wavelength was monitored, and the temperature shifts estimated by a applying a typical 0.1 nm/deg C temperature coefficient.

Spice Analysis

Figure 8:
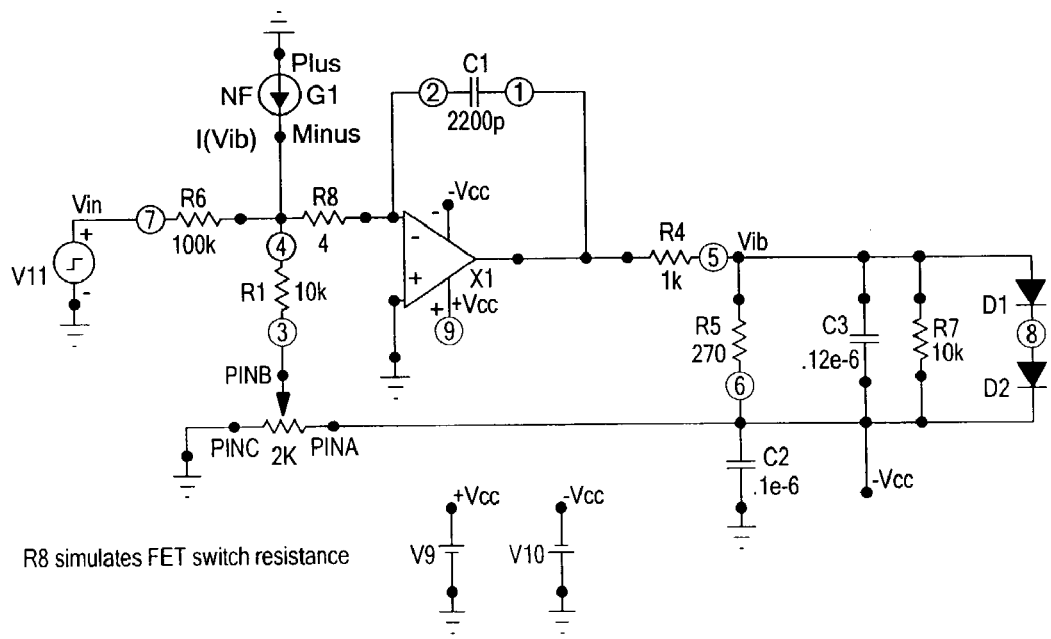
FIG. 8 is a schematic for SPICE analysis of APC loop dynamics.

To examine the dynamics of the circuit during burst-mode switching, a SPICE (Simulation Program Integrated Circuits Especially) circuit analysis was performed based upon the schematic of FIG. 8. A simple schematic using the SPICE .subckt model from National Semiconductor for the actual LMC6484 operational amplifier was used for comparison with the previous analytic results.

Figure 9:
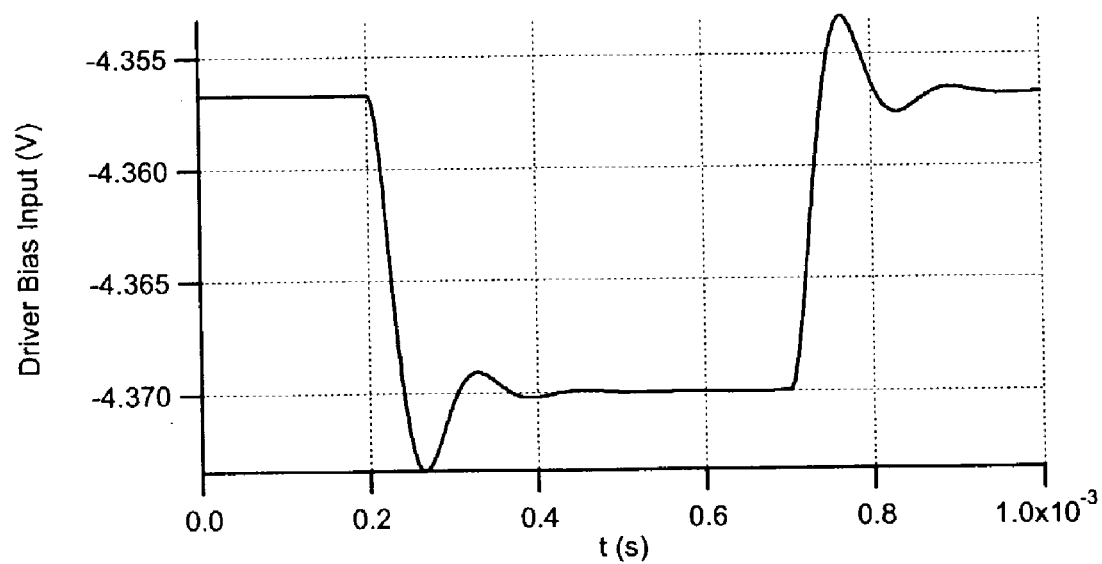
FIG. 9 is a graphical depiction of SPICE model results for APC step (square wave) response.

The modeled transient result for the driver bias input voltage is shown in FIG. 9. As can be seen, this is in substantial agreement with the previous analytic and experimental results of FIGS. 4A and 4B.

Figure 10:
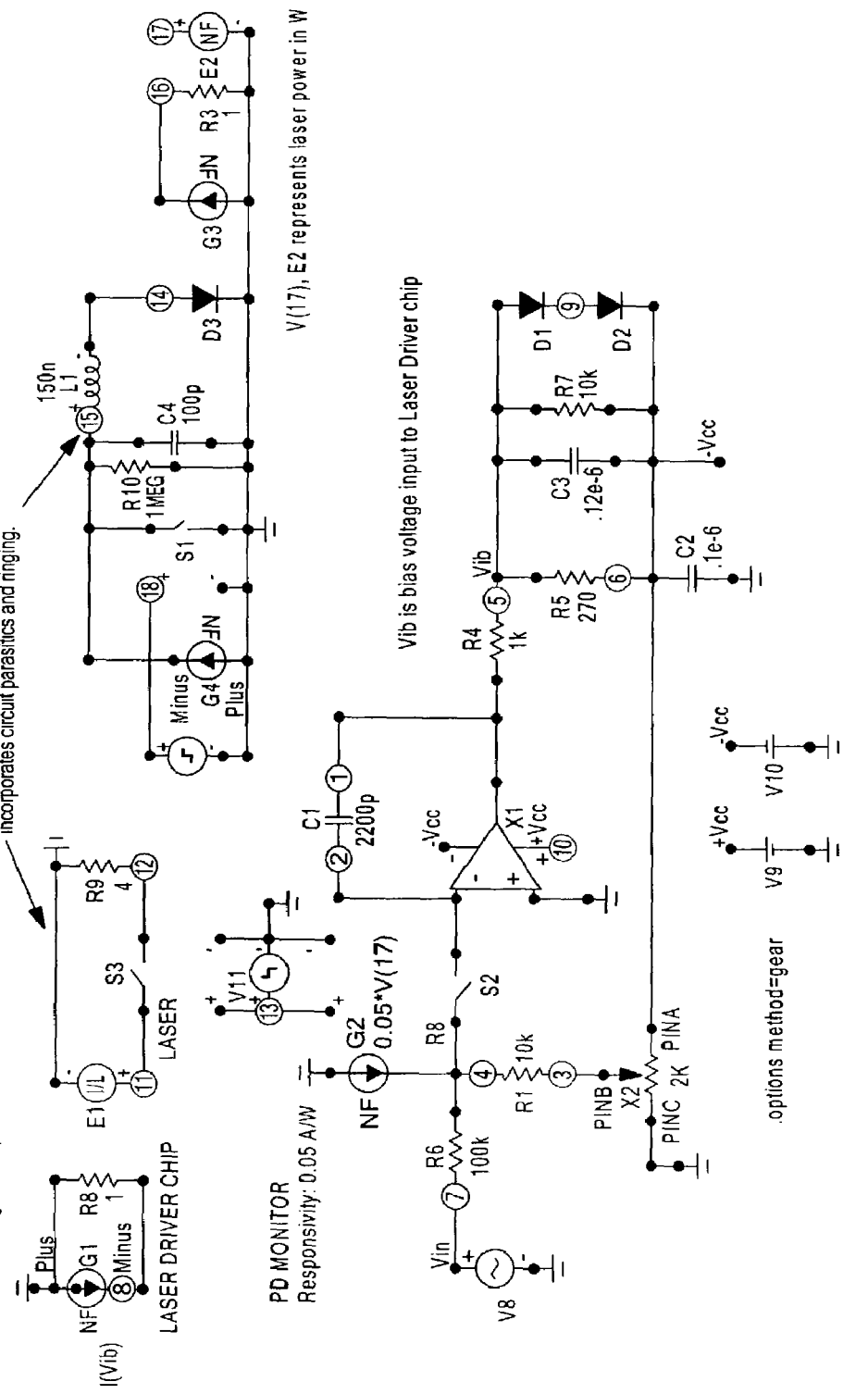
FIG. 10 is a schematic of SPICE burst-mode simulator.

A more elaborate model, which is shown in FIG. 10, was then used to examine the burst-mode operation of the device.

No device models were available for the laser driver chip or CMOS switch, but these were simulated by non-linear dependent sources available in SPICE. Similarly an empirical dependent source model for the laser power was used. The actual carrier-photon dynamics of the laser were not used, because these contribute to relaxation oscillations on a time scale orders of magnitude shorter than the time intervals used in the present analysis.

Figure 11:
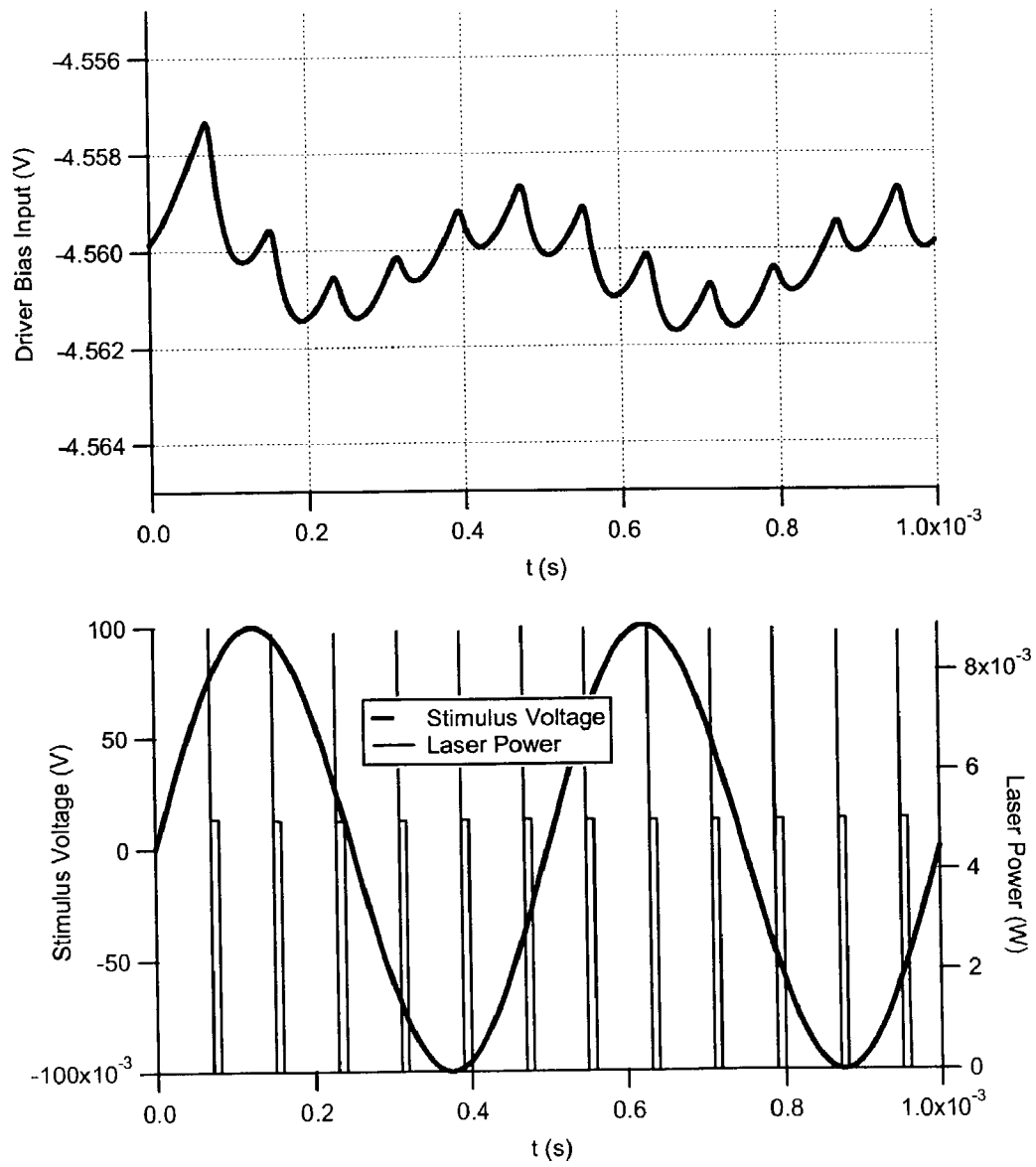
FIG. 11 is a graphical depiction of SPICE burst-mode simulation results.

A slow sinusoidal input is applied to the stimulus port, and more rapid burst-mode modulation simultaneously turns the laser off and on by shunting the driver output current, and opens and closes the CMOS switch to the operational amplifier. The simulation results are shown in FIG. 11. The top curve shows the driver input, with a slow sinusoidal response to the stimulus altered by the sample-and-hold action of the feedback amplifier. The bottom graph shows the sinusoidal stimulus and laser burst-mode power. Note that the laser shows ringing deliberately introduced through its parasitic circuit elements. The burst-mode feedback during this relatively rapid sinusoidal modulation introduces about 1 mV perturbation to the sinusoidal response, corresponding to about 0.1 mA laser bias perturbation.

Integrated PCB Circuit Results

Results pertain to an uncooled 1550 nm DFB laser diode in a surface-mount mini-DIL package, Mitsubishi FU-645SDF-V1M1B. This device has a nominal output power of 2 mW (3 dBm) at an operating current of 40 mA. The integrated PCB used the Fujitsu FMM3175VI laser driver chip. The automatic power control circuit, which is described above, was implemented in two versions, one having manual screw-adjusted potentiometers for power setting, and the other digital potentiometers. Both versions of the APC circuit functioned similarly.

The APC uses feedback from an internal photodiode in the laser package to monitor the laser optical power and adjust the CW bias current from the laser driver chip. An operational amplifier (National LMC6484) integrator converts the diode photocurrent to a driver control voltage. Burst-mode capability is added by ENABLING/DISABLING the laser driver output, while simultaneously closing/opening a CMOS switch (Maxim MAX4644) providing the photocurrent to the operational amplifier. During the burst OFF state, in the DISABLE (and open) mode, the voltage across the operational amplifier capacitor is held nearly constant. When the next laser burst (ON state) occurs, the previous APC signal becomes the initial control level, preventing large transients in the bias level. Unlike the breadboard design of the first APC circuit, no jumpers were provided to allow manual (constant current) bias setting. The other major difference from the breadboard design was the use of a mini-DIL packaged laser, having no internal thermoelectric temperature control.

Figure 12:
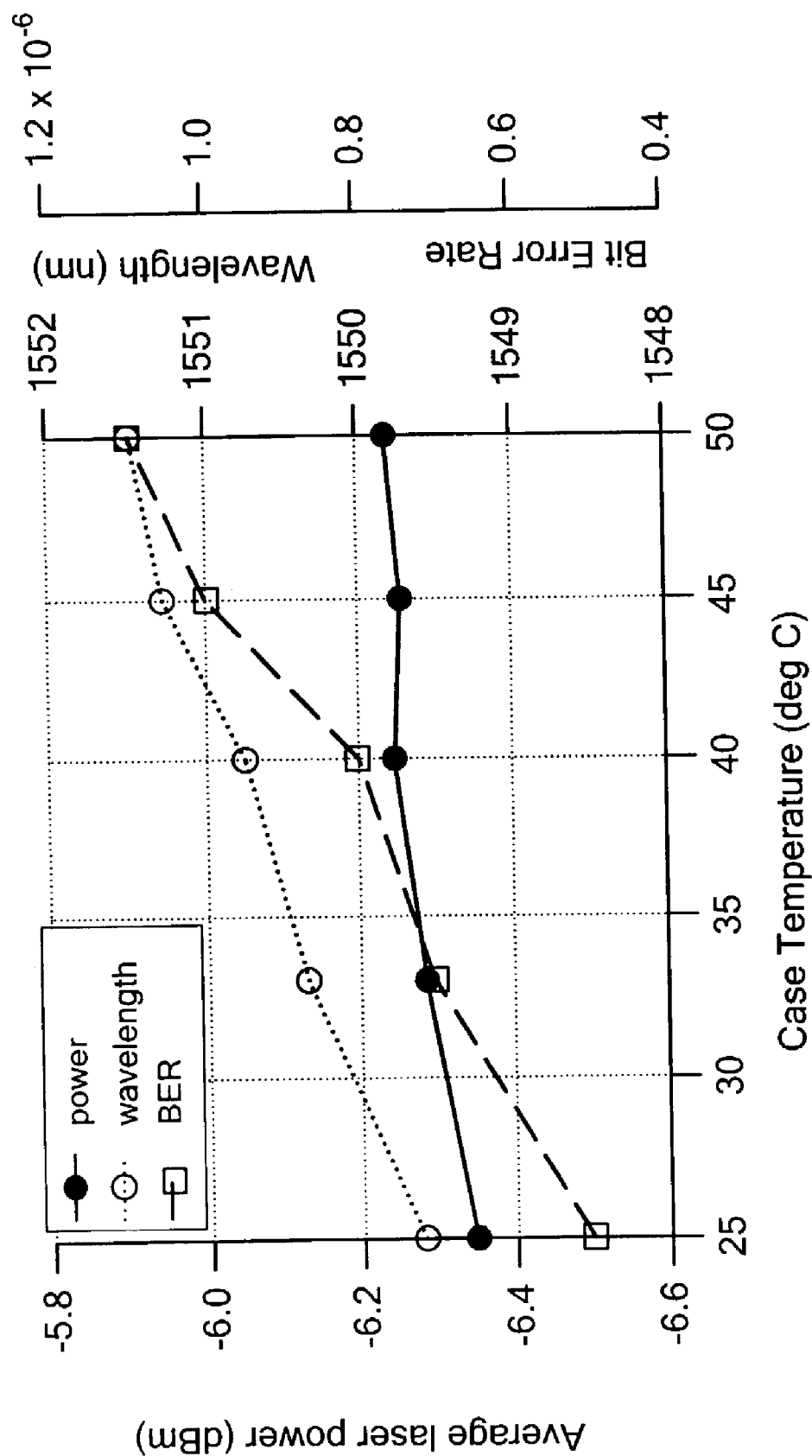
FIG. 12 is a graphical depiction of transmitter temperature dependence.
Figure 13:
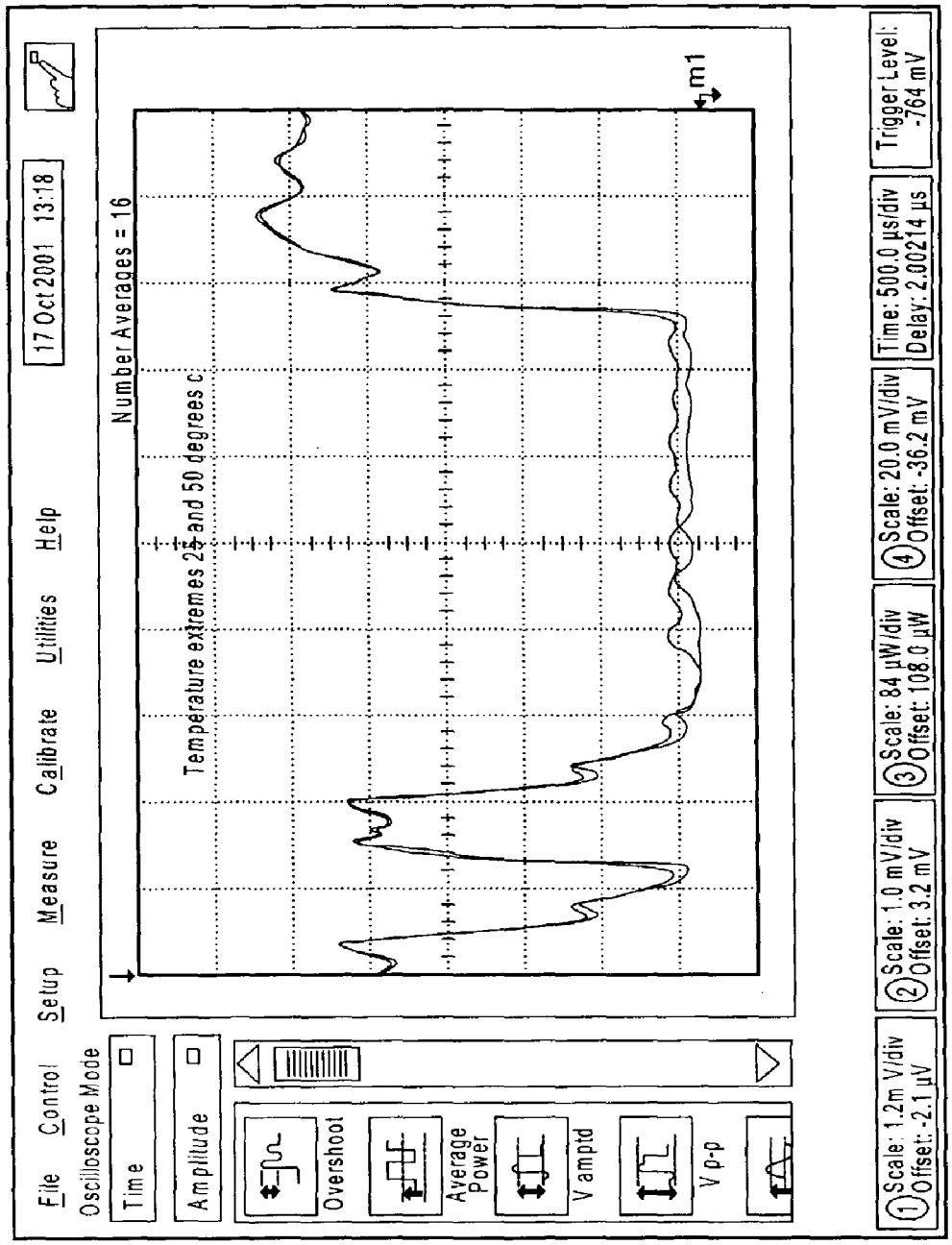
FIG. 13 is a screen display of bit-resolved laser output at 25, 50 C.

The ability of the APC circuit to compensate for temperature changes of the mini-DIL laser is shown in FIG. 12. In this case, the laser was run in a constant ON state, with a $2^7$-1 PRBS, to allow monitoring of the received bit-error-rate as well as the average power. A portion of the laser power was tapped off to provide the power measurement. The laser power was put into an adjustable optical attenuator, which adjusted the level to provide an initial −30.8 dBm power into an off-board APD receiver (not affected by temperature changes). This power level was set to provide a measurable bit-error-rate whose changes could be noted. In this case the initial bias and modulation depth were set to provide optimum BER results at 25 C. Temperature was varied by applying hot air from an electric heat gun to the circuit. The temperature was measured using a thermistor attached to the laser diode case. As the temperature increased, the average optical power varied only 0.11 dB. Assuming that the APC circuit maintains an output stabilized on the average monitor photodiode current, the increase in average power with temperature probably arises from other temperature-dependent effects on the ratio of output power to photocurrent. These might include changes in the fiber output coupling and photodiode responsivity. The depth of modulation decreases slightly, from a drop in laser slope efficiency. The combination of modulation decrease and threshold increase cause a rise in the baseline ZERO-bit level. The extinction ratio increase and modulation depth decrease cause a slight increase in BER, as shown by the data, even though the average power has actually increased very slightly. These conditions are shown in the traces of FIG. 13. The upper level hardly changes, but the ZERO level shows a temperature-dependent shift.

Figure 14:
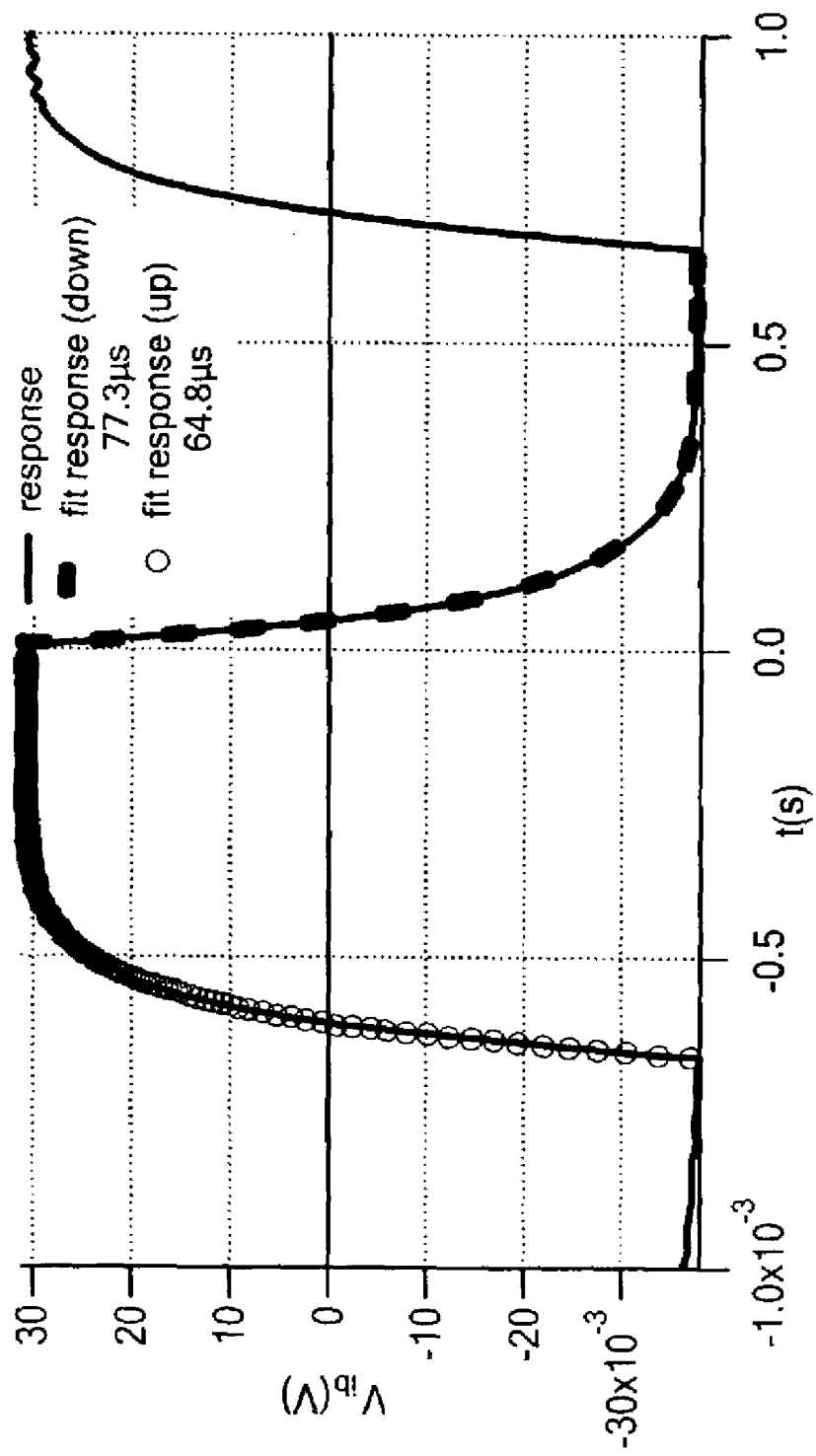
FIG. 14 is a graphical depiction of transient APC loop response.

The dynamics of the APC feedback loop were measured by injecting test signals at the monitor photodiode (anode) input node. An additional 100 kOhm resistor was added to the circuit at that point, and voltages from a function generator were applied to the other end of the resistor (creating an effective current source input). The response was measured with an oscilloscope high-impedance probe attached to the laser driver bias input. The transient response using a square-wave input is shown in FIG. 14. The time constants for fits to simple single-pole exponential decays are shown in the figure.

Figure 15:
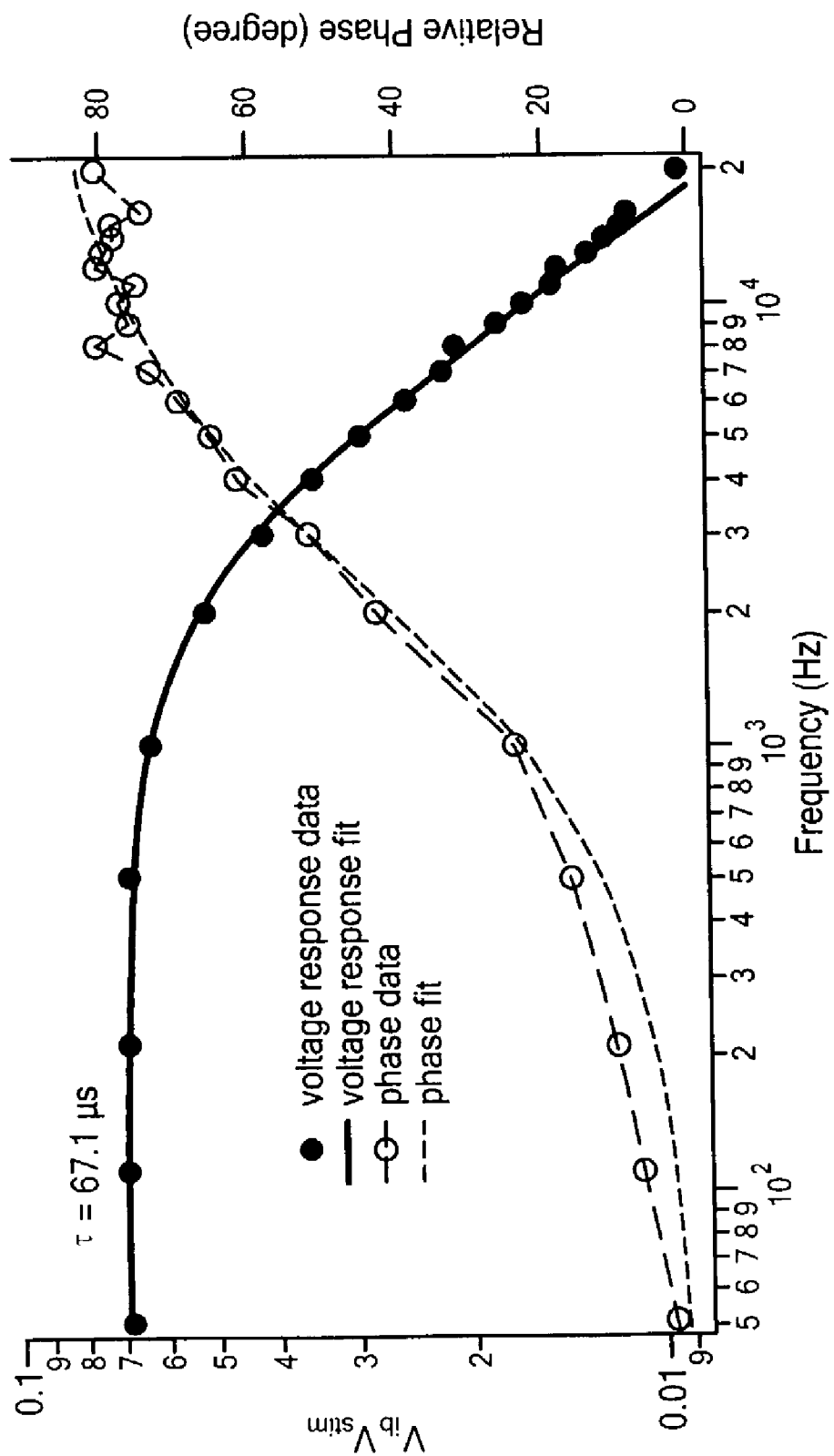
FIG. 15 is a graphical depiction of Frequency response of APC loop.

The complementary results of a frequency response measurement are shown in FIG. 15. Curve fitting was done to the amplitude data with a one-pole response function. The pole location was then used to create the phase fit function. Note that the time constant lies between the two values shown in FIG. 14.

One finding in these data using the PCB circuit is that the APC loop response agrees with the model predicted for the circuit. In the previous results from the breadboard measurements, the loop response had transient overshoot, and frequency peaking that could be modeled using additional capacitance across the driver input. Analysis of the fitting data from the frequency response yields an effective loop gain resistance parameter, $R_{eff}$=6.7±0.3 kΩ. This resistance is the inverse product of the linear response coefficients of the laser driver, laser diode optical power, and photodiode responsivity. Estimating the range of values from the component data sheets gives predicted values from 100Ω to 3.3 kΩ. The measured resistance implies that the product of laser slope efficiency and photodiode responsivity for the Mitsubishi FU-654SDF laser is half of the specification's lowest case product.

Figure 16:
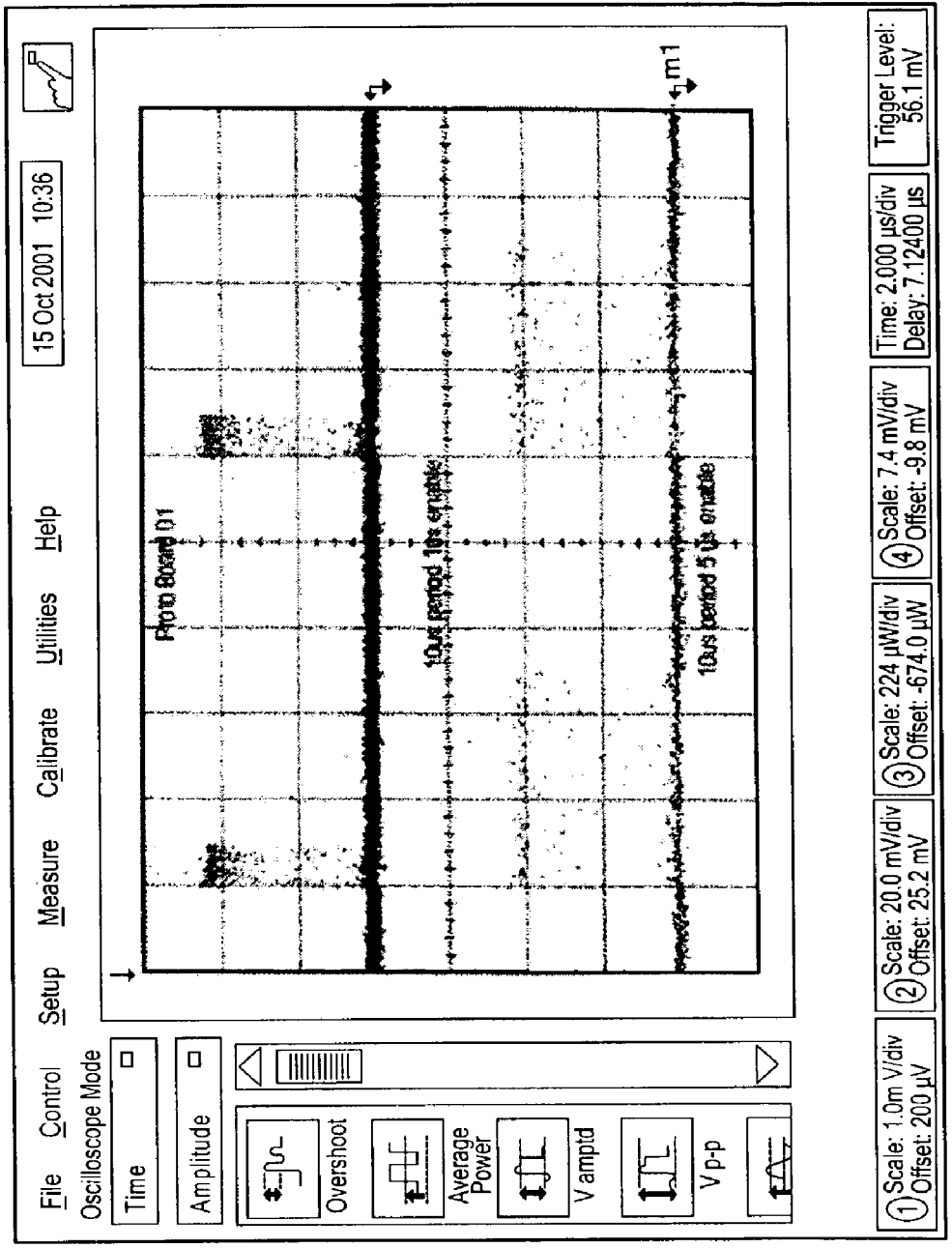
FIG. 16 is a screen display of burst-mode laser output.

The ability of the APC circuit to stabilize power was measured under various burst-mode conditions. FIG. 16 shows behavior typical of that expected in a short burst regime. A tapped portion of the laser power was measured at the optical input of the sampling oscilloscope. The top trace shows the response of 1 μs bursts with 10 μs period (10% duty cycle). The bottom trace shows 5 μs bursts with 10 μs period (50% duty cycle). The 2.5 Gbps data modulation is not resolved at these coarse time scales. The burst envelope level is maintained at these different duty cycles.

Figure 17:
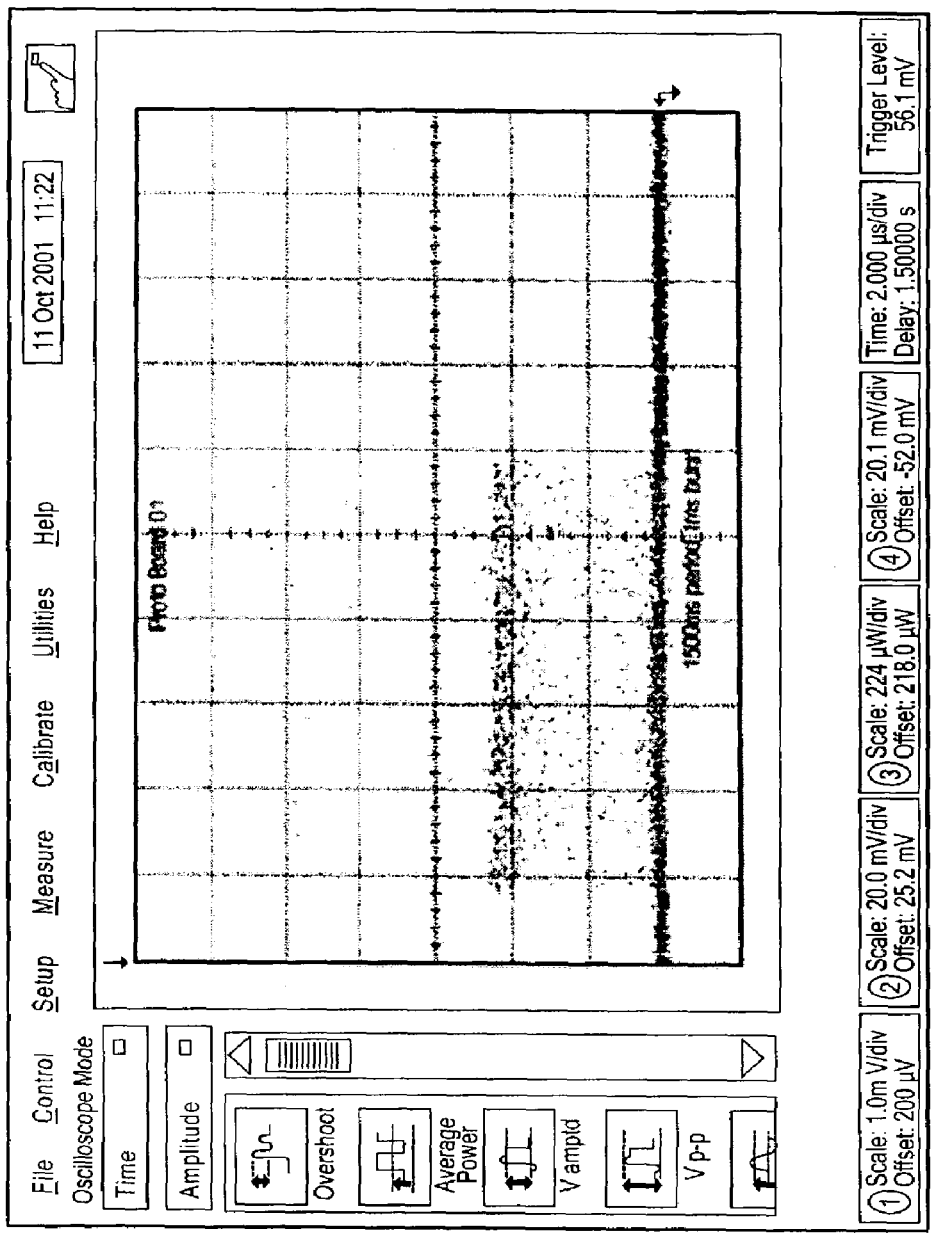
FIG. 17 is a screen display of laser power with long-duration burst times.

An example of results at the opposite extreme of burst parameters is shown in FIG. 17. In the burst-mode duty cycle testing, a constant $2^7$-1 PRBS data stream was input to the laser driver. The output data was turned off solely through the use of the driver ENABLE/DISABLE signal. In these long-burst-duration tests, a 1 ms burst was used with varying period (duty cycle). No changes were observed in measurements with period up to 1.5 s (FIG. 17). Note that the envelope amplitude is the same as the shorter microsecond bursts. The repetition period is too long to show on the oscilloscope with meaningful display.

In scheduled burst-mode operation, the data is present only when the laser driver is ENABLED. Since the driver bias output is observed to interact slightly with the data modulation we measured the consequences of having the data occur in bursts. Specifically, we determined the timing constraints necessary to ensure data integrity. To aid in visual bit counting, we used programmed 101010 . . . . data patterns with alternating longer sequences of 5 zeros and five ones interspersed near the beginning and end of the burst pattern.

Figure 18:
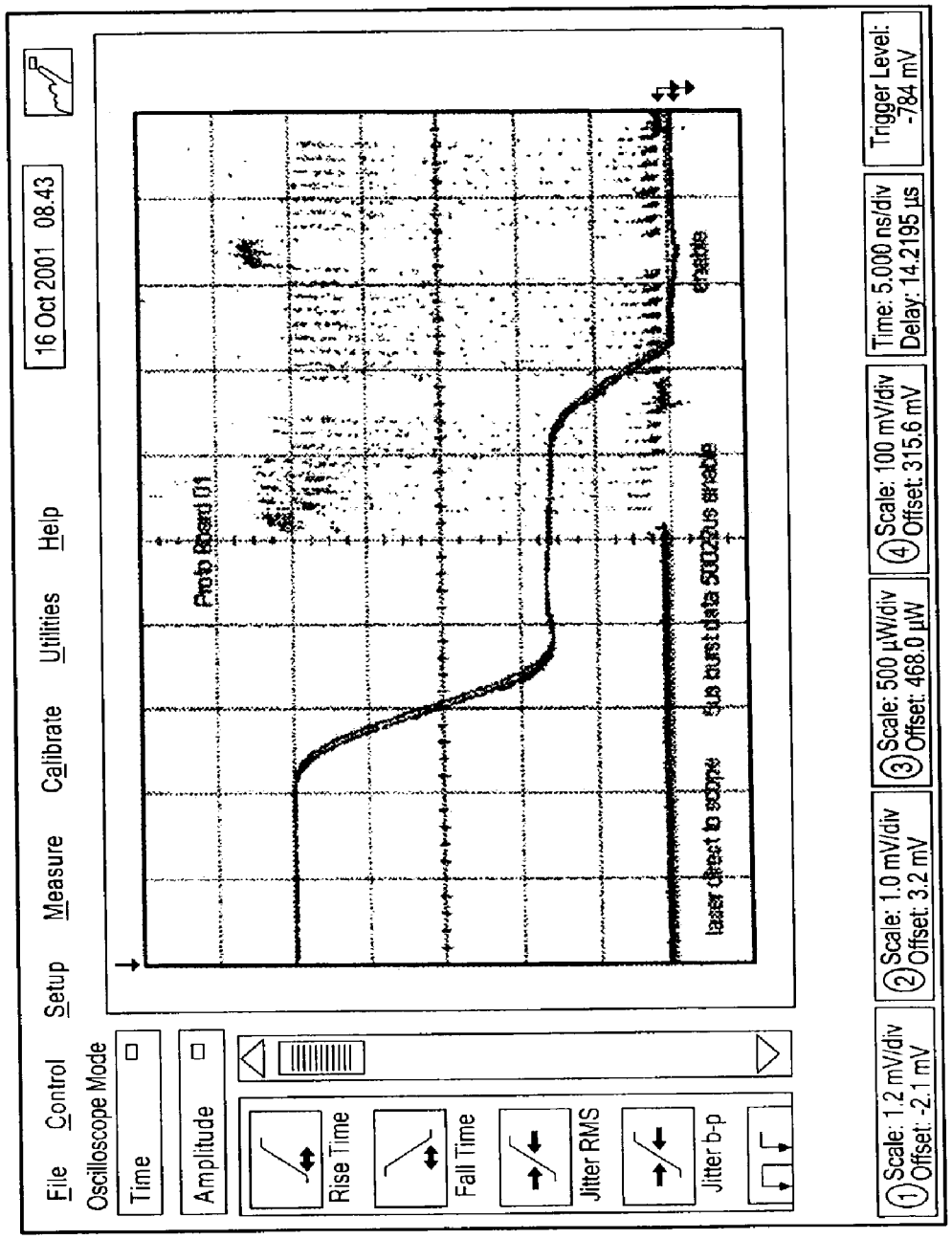
FIG. 18 is a screen display of a leading edge of a burst data pattern.

FIG. 18 shows the leading edge of a 5 µs burst, with embedded runs of zeros and ones. The continuous trace is the pulse generator output signal, with ENABLE state low. The middle pedestal is an artifact of splitting the signal into the 50Ω input impedance of the oscilloscope. Logic triggering occurs at the leading edge of the pulse. When the 5 ns additional delay due to the laser fiber pigtail is included, we estimate 5 ns latency before the driver is enabled. Moving the edge of the ENABLE signal closer to the burst truncates bits from the data. This indicates that the ENABLE pulse at the driver must precede the data by 5 ns. However, since the burst begins with a long clock recovery preamble, this requirement may be relaxed if the remaining preamble is long enough for clock recovery.

However, if the ENABLE pulse precedes the data burst by too long a duration, care must be taken with the laser driver output characteristics. With AC coupling of the modulation input (as is typically recommended) long quiescent times lead to a zero modulation voltage which is an undefined state for many drivers. It is believed that the use of an asymmetric voltage pull-up circuit will ensure that such input results in a LOW logic level output from the driver modulation pin.

Figure 19:
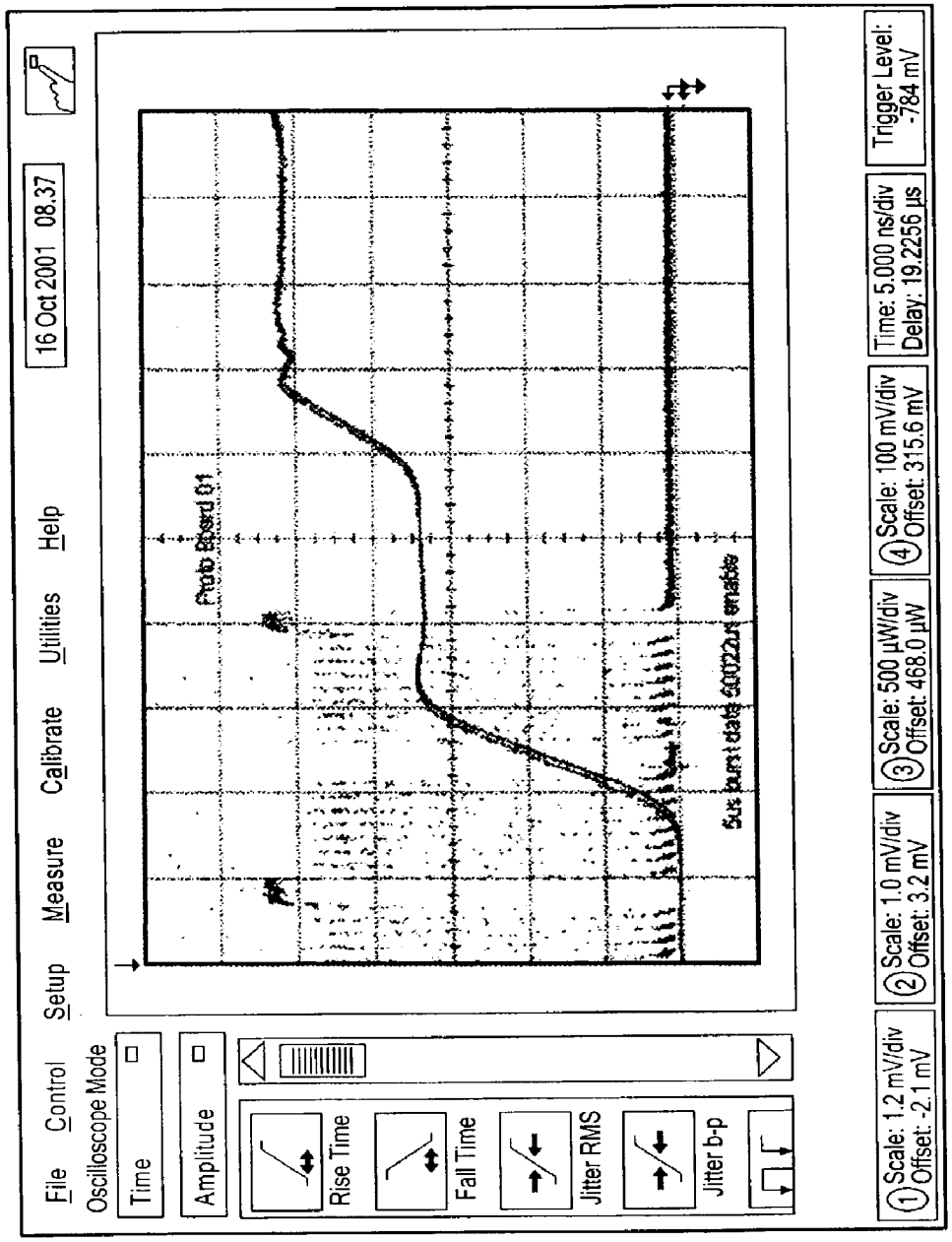
FIG. 19 is a screen display of a trailing edge of a data pattern.

The traces in FIG. 19 show the trailing edge of the burst data pattern and the DISABLE pulse edge. Moving the DISABLE pulse to the left begins to truncate data bits. Allowing for the fiber delay, we estimate that the DISABLE pulse cannot precede the burst end by more than 5 ns. The maximum delay in the DISABLE pulse is determined by the driver circuit's response to very long runs of zeros, and the same issues of zero input voltage leading to LOW output should be ensured.

The present invention provides an APC circuit that stabilizes the average power level by adjusting the laser dc bias current. This is effective in compensating for aging- and temperature-dependent changes in the laser threshold. However, the average power is also influenced by the modulation depth of the laser output. If the laser slope efficiency changes, the result of only average power stabilization will be to increase the LOW output level, and decrease the modulation depth. Control of the modulation depth requires a separate, more complicated feedback loop which can adjust the modulation depth control to the laser driver.

The second feedback loop should also have a relatively low-frequency response, comparable to the bias control circuit. Whatever its means of implementation (i.e. modulation depth sensing technique), its quasi-cw feedback voltage could also be fed into the same type of gated-integrator circuit that would stabilize its level in very low duty-cycle scenarios. The Fujitsu laser driver chip used in the present circuit performs quite well. Other driver chips that provide for a fast control of the driver output (ENABLE/DISABLE capability) should be usable as well.

What is claimed is:

1. A system for regulating optical power, comprising:
   a laser driver circuit receiving an enable/disable signal and a data modulator input, the enable/disable signal to regulate asynchronous burst mode operation;
   a laser module coupled to the laser driver circuit, the laser module including a laser diode emitter and a photodiode detector, the laser module receiving a laser bias current from the laser driver circuit;
   a switch coupled to the photodiode detector, the switch receiving the enable/disable signal and a signal from the photodiode detector; and
   an automatic power control (APC) feedback circuit receiving a signal from the switch and providing a laser bias current feedback signal to the laser driver circuit to compensate for power output changes in the laser diode emitter over time.

2. The system according to claim 1, wherein the enable/disable signal is active for a burst mode of less than about 5 µs.

3. The system according to claim 1, wherein the APC feedback circuit includes an integrating amplifier circuit including an amplifier and a capacitor.

4. The system according to claim 3, wherein the amplifier circuit maintains the feedback signal when the switch is in the open position.

5. The system according to claim 4, wherein the APC feedback circuit feedback signal is responsive to changes in the signal from the photodiode detector.

6. The system according to claim 1, further including a signal level converter coupled to the laser driver circuit for converting the enable/disable signal.

7. The system according to claim 1, wherein the APC feedback circuit compensates for temperature changes.

8. A system for regulating optical power, comprising:
   a laser driver circuit receiving an enable/disable signal and a data modulator input, the enable/disable signal to regulate asynchronous burst mode operation;
   a laser module coupled to the laser driver circuit, the laser module including a laser diode emitter and a photodiode detector, the laser module receiving a laser bias current from the laser driver circuit;
   a switch coupled to the photodiode, the switch receiving the enable/disable signal and a signal from the photodiode detector; and
   a means for generating automatic power control (APC) feedback by receiving a signal from the switch and providing a laser bias current feedback signal to the laser driver circuit to compensate for laser power output changes over time.

9. The system according to claim 8, wherein the means for generating APC feedback includes an integrating amplifier circuit including an amplifier and a capacitor.

10. The system according to claim 9, wherein the amplifier circuit maintains the feedback signal when the switch is in the open position.

11. The system according to claim 8, wherein the means for generating APC feedback circuit compensates for temperature changes.

12. A method of regulating optical output power, comprising:
   receiving a data modulation input signal at a laser driver circuit;
   receiving an enable/disable signal at a switch and the laser driver circuit, the enable/disable signal to regulate asynchronous burst mode operation;
   receiving a laser bias current at a laser module having a laser diode emitter and a photodiode detector;

receiving the enable/disable signal and a signal from the photodiode detector at a switch;

receiving a signal from the switch at an automatic power control feedback circuit; and providing a laser bias current signal to the laser driver circuit from the automatic power control feedback circuit to compensate for power output changes of the laser diode emitter over time.

13. The method according to claim 1, further including compensating for temperature changes.

14. The method according to claim 1, wherein the laser driver circuit uses the laser bias current feedback signal to adjust the laser bias current.

* * * * *